US012665185B2

(12) United States Patent
Jang et al.

(10) Patent No.: US 12,665,185 B2
(45) Date of Patent: Jun. 23, 2026

(54) POSITIVE ACTIVE MATERIAL FOR RECHARGEABLE LITHIUM BATTERY, PREPARING METHOD THEREOF AND RECHARGEABLE LITHIUM BATTERY INCLUDING THE SAME

(71) Applicant: SAMSUNG SDI CO., LTD., Yongin-si (KR)

(72) Inventors: Jungsue Jang, Yongin-si (KR); Donghyun Kil, Yongin-si (KR); Jinyoung Kim, Yongin-si (KR); Jaeha Shim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 639 days.

(21) Appl. No.: 17/885,219

(22) Filed: Aug. 10, 2022

(65) Prior Publication Data

US 2023/0109315 A1 Apr. 6, 2023

(30) Foreign Application Priority Data

Aug. 13, 2021 (KR) ........................ 10-2021-0107568
Aug. 3, 2022 (KR) ........................ 10-2022-0096847

(51) Int. Cl.

| | |
|---|---|
| ***H01M 4/36*** | (2006.01) |
| ***C01G 53/50*** | (2025.01) |
| ***H01M 4/02*** | (2006.01) |
| ***H01M 4/04*** | (2006.01) |
| ***H01M 4/505*** | (2010.01) |
| ***H01M 4/525*** | (2010.01) |
| ***H01M 10/0525*** | (2010.01) |

(52) U.S. Cl.

CPC ............ *H01M 4/364* (2013.01); *C01G 53/50* (2013.01); *H01M 4/0471* (2013.01); *H01M 4/505* (2013.01); *H01M 4/525* (2013.01); *H01M 10/0525* (2013.01); *C01P 2002/50* (2013.01); *C01P 2004/03* (2013.01); *C01P 2004/61* (2013.01); *C01P 2004/84* (2013.01); *C01P 2006/40* (2013.01); *H01M 2004/021* (2013.01); *H01M 2004/028* (2013.01)

(58) Field of Classification Search

CPC .... H01M 4/364; H01M 4/0471; H01M 4/505; H01M 4/525; H01M 4/366; H01M 4/131; H01M 10/0525; H01M 10/052; H01M 2004/021; H01M 2004/028; C01G 53/50; C01G 53/00; C01G 53/42; C01P 2002/50; C01P 2002/52; C01P 2004/84; C01P 2004/03; C01P 2004/61; C01P 2006/40; C01P 2006/12; Y02E 60/10

See application file for complete search history.

(56) References Cited

U.S. PATENT DOCUMENTS

| | | | |
|---|---|---|---|
| 6,589,499 | B2 | 7/2003 | Gao et al. |
| 10,056,605 | B2 | 8/2018 | Oh et al. |
| 2004/0058243 | A1 | 3/2004 | Ohzuku et al. |
| 2007/0122705 | A1 | 5/2007 | Paulsen et al. |
| 2008/0026292 | A1 | 1/2008 | Paulsen et al. |
| 2008/0248391 | A1 | 10/2008 | Wakasugi et al. |
| 2009/0029253 | A1 | 1/2009 | Itou et al. |
| 2009/0258296 | A1 | 10/2009 | Kawasato et al. |
| 2010/0081055 | A1 | 4/2010 | Konishi et al. |
| 2011/0079752 | A1 | 4/2011 | Park et al. |
| 2011/0226986 | A1 | 9/2011 | Wang et al. |
| 2011/0240913 | A1 | 10/2011 | Kim et al. |
| 2012/0085967 | A1 | 4/2012 | Yokoyama et al. |
| 2012/0100429 | A1 | 4/2012 | Sueki et al. |
| 2012/0261610 | A1 | 10/2012 | Paulsen et al. |
| 2013/0316237 | A1 | 11/2013 | Miki |
| 2014/0106212 | A1 | 4/2014 | Choi et al. |
| 2014/0131633 | A1 | 5/2014 | Ito et al. |
| 2014/0205898 | A1 | 7/2014 | Lee et al. |

(Continued)

FOREIGN PATENT DOCUMENTS

| | | | |
|---|---|---|---|
| CN | 101167209 | A | 4/2008 |
| CN | 101714630 | A | 5/2010 |

(Continued)

OTHER PUBLICATIONS

US Office Action dated Jun. 13, 2024, issued in U.S. Appl. No. 18/329, 199 (8 pages).
US Office Action dated Sep. 5, 2024, issued in U.S. Appl. No. 17/657,316 (10 pages).
US Office Action dated Sep. 26, 2024, issued in U.S. Appl. No. 18/603,865 (15 pages).
Chinese Office Action dated Sep. 20, 2024, issued in Chinese Patent Application No. 202210361208.0 (8 pages).
Office Action for Japanese Patent Application No. 2021-184817 dated Jun. 19, 2023, 3 pages.
Korean Notice of Allowance dated Feb. 3, 2025, issued in Korean Patent Application No. 10-2022-0096847, 3 pages.

(Continued)

*Primary Examiner* — Niki Bakhtiari
*Assistant Examiner* — Madison Leigh Kyle
(74) *Attorney, Agent, or Firm* — Womble Bond Dickinson (US) LLP

(57) ABSTRACT

A positive active material for a rechargeable lithium battery, a preparing method thereof, and a rechargeable lithium battery including the same are provided. The positive active material for a rechargeable lithium battery includes a first positive active material including a first lithium nickel-based composite oxide and including secondary particles formed by aggregation of a plurality of primary particles and a cobalt coating portion on the surface of the secondary particles; and a second positive active material including a second lithium nickel-based composite oxide and including individual particles and a cobalt coating portion on the surface of the individual particles, wherein the second positive active material has an uneven surface having concavo-convex features and an even surface that is substantially flat.

11 Claims, 8 Drawing Sheets

(56) References Cited

U.S. PATENT DOCUMENTS

| | | | |
|---|---|---|---|
| 2014/0205906 | A1 | 7/2014 | Kudo et al. |
| 2014/0212759 | A1 | 7/2014 | Blangero et al. |
| 2015/0010819 | A1 | 1/2015 | Lee et al. |
| 2015/0064577 | A1 | 3/2015 | Natsui et al. |
| 2015/0093580 | A1 | 4/2015 | Kobayashi et al. |
| 2015/0188139 | A1 | 7/2015 | Kitagawa et al. |
| 2015/0228971 | A1 | 8/2015 | Kim et al. |
| 2015/0340686 | A1 | 11/2015 | Sun et al. |
| 2016/0156020 | A1 | 6/2016 | Tokoro et al. |
| 2016/0301069 | A1 | 10/2016 | Kwak et al. |
| 2016/0380263 | A1 | 12/2016 | Nakayama et al. |
| 2017/0222211 | A1 | 8/2017 | Ryu et al. |
| 2017/0222221 | A1 | 8/2017 | Park et al. |
| 2017/0222225 | A1 | 8/2017 | Kang et al. |
| 2017/0309910 | A1 | 10/2017 | Jo et al. |
| 2017/0317342 | A1 | 11/2017 | Kang et al. |
| 2017/0358799 | A1 | 12/2017 | Gunji et al. |
| 2018/0026268 | A1 | 1/2018 | Kim et al. |
| 2018/0048015 | A1 | 2/2018 | Lee et al. |
| 2018/0108940 | A1 | 4/2018 | Kwon et al. |
| 2018/0151876 | A1 | 5/2018 | Kim et al. |
| 2018/0212237 | A1 | 7/2018 | Lee et al. |
| 2018/0248180 | A1 | 8/2018 | Liu et al. |
| 2018/0261842 | A1 | 9/2018 | Park et al. |
| 2018/0287152 | A1* | 10/2018 | Yasumiishi ........... H01M 4/366 |
| 2018/0316005 | A1 | 11/2018 | Shin et al. |
| 2019/0020024 | A1 | 1/2019 | Wang et al. |
| 2019/0044127 | A1 | 2/2019 | Kim |
| 2019/0173076 | A1 | 6/2019 | Kim et al. |
| 2019/0296349 | A1 | 9/2019 | Cho et al. |
| 2019/0355981 | A1 | 11/2019 | Chang et al. |
| 2019/0379043 | A1 | 12/2019 | Toma et al. |
| 2020/0083531 | A1 | 3/2020 | Choi et al. |
| 2020/0127276 | A1 | 4/2020 | Kim et al. |
| 2020/0144610 | A1 | 5/2020 | Hong et al. |
| 2020/0185714 | A1 | 6/2020 | Han et al. |
| 2020/0295368 | A1 | 9/2020 | Kong et al. |
| 2021/0119204 | A1 | 4/2021 | Celasun et al. |
| 2021/0167366 | A1 | 6/2021 | Leng et al. |
| 2022/0029147 | A1 | 1/2022 | Ogawa et al. |
| 2022/0029158 | A1 | 1/2022 | Takamori |
| 2022/0059836 | A1 | 2/2022 | Hiratsuka et al. |
| 2022/0077450 | A1* | 3/2022 | Jang ...................... H01M 4/364 |
| 2022/0238872 | A1 | 7/2022 | Kim et al. |
| 2023/0018761 | A1 | 1/2023 | Kageura et al. |
| 2023/0109315 | A1 | 4/2023 | Jang et al. |
| 2023/0155123 | A1 | 5/2023 | Lee et al. |

FOREIGN PATENT DOCUMENTS

| | | | |
|---|---|---|---|
| CN | 104584282 | A | 4/2015 |
| CN | 105185982 | A | 12/2015 |
| CN | 107112515 | A | 8/2017 |
| CN | 107251282 | A | 10/2017 |
| CN | 109982973 | A | 7/2019 |
| CN | 109997255 | A | 7/2019 |
| CN | 111146413 | A | 5/2020 |
| CN | 111697224 | A | 9/2020 |
| CN | 112151794 | A | 12/2020 |
| CN | 112750999 | A | 5/2021 |
| CN | 113165907 | A | 7/2021 |
| CN | 114556614 | A | 5/2022 |
| CN | 114784263 | A | 7/2022 |
| CN | 116565177 | A | 8/2023 |
| EP | 1 876 664 | A1 | 1/2008 |
| EP | 2 169 745 | A1 | 3/2010 |
| EP | 3 425 703 | B1 | 1/2019 |
| EP | 3647269 | A1 | 5/2020 |
| EP | 3723172 | A2 | 10/2020 |
| JP | 2001-167761 | A | 6/2001 |
| JP | 2012-49090 | A | 3/2012 |
| JP | 2013-038022 | A | 2/2013 |
| JP | 2013-120676 | A | 6/2013 |
| JP | 2015-076397 | A | 4/2015 |
| JP | 2016-51503 | A | 4/2016 |
| JP | 2016-76294 | A | 5/2016 |
| JP | 2018-014326 | A | 1/2018 |
| JP | 2018-92931 | A | 6/2018 |
| JP | 2018-531500 | A | 10/2018 |
| JP | 2018-532236 | A | 11/2018 |
| JP | 6544951 | B2 | 7/2019 |
| JP | 2020-72092 | A | 5/2020 |
| JP | 2020-77611 | A | 5/2020 |
| JP | 2020-87879 | A | 6/2020 |
| JP | 2021-22547 | A | 2/2021 |
| JP | 2021-508410 | A | 3/2021 |
| JP | 2021-95298 | A | 6/2021 |
| JP | 2023-26409 | A | 2/2023 |
| KR | 2003-0045853 | A | 6/2003 |
| KR | 10-2006-0105039 | A | 10/2006 |
| KR | 10-2009-0032138 | A | 3/2009 |
| KR | 10-2010-0130522 | A | 12/2010 |
| KR | 10-2011-0109879 | A | 10/2011 |
| KR | 10-1154880 | B1 | 6/2012 |
| KR | 10-1244050 | B1 | 3/2013 |
| KR | 10-2014-0025597 | A | 3/2014 |
| KR | 10-2014-0093529 | A | 7/2014 |
| KR | 10-1452950 | B1 | 10/2014 |
| KR | 10-1593401 | B1 | 2/2016 |
| KR | 10-1595322 | B1 | 2/2016 |
| KR | 10-1604509 | B1 | 3/2016 |
| KR | 10-2016-0049519 | A | 5/2016 |
| KR | 10-2016-0129764 | A | 11/2016 |
| KR | 10-2017-0063408 | A | 6/2017 |
| KR | 10-2017-0093085 | A | 8/2017 |
| KR | 10-1785262 | B1 | 10/2017 |
| KR | 10-2018-0059736 | A | 6/2018 |
| KR | 10-2018-0121267 | A | 11/2018 |
| KR | 10-2019-0006906 | A | 1/2019 |
| KR | 10-2019-0065963 | A | 6/2019 |
| KR | 10-1989399 | B1 | 6/2019 |
| KR | 10-2020-0043612 | A | 4/2020 |
| KR | 10-2020-0051101 | A | 5/2020 |
| KR | 10-2020-0070649 | A | 6/2020 |
| KR | 10-2144056 | B1 | 8/2020 |
| KR | 10-2020-0110027 | A | 9/2020 |
| KR | 10-2175126 | B1 | 11/2020 |
| KR | 10-2021-0095149 | A | 7/2021 |
| WO | WO 2015/053580 | A1 | 4/2015 |
| WO | WO 2016/129629 | A1 | 8/2016 |
| WO | 2020/137296 | A1 | 7/2020 |
| WO | WO 2021/125535 | A1 | 6/2021 |

OTHER PUBLICATIONS

EPO Extended European Search Report dated Jan. 3, 2023, issued in European Patent Application No. 22189038.7 (9 pages).

Chinese Office Action dated Mar. 15, 2025, issued in Chinese Patent Application No. 202210938027.X (11 pages).

Korean Office Action dated Oct. 16, 2024, issued in Korean Patent Application No. 10-2021-0069175 (8 pages).

Korean Office Action dated Nov. 21, 2024, issued in Korean Patent Application No. 10-2022-0096847, together with English translation from EPO Global Dossier—"Request for the Submission of an Opinion", 25 pages.

Li, Guangxin, et al., "Ultrathin Li—Si—O Coating Layer to Stabilize the Surface Structure and Prolong the Cycling Life of Single-Crystal LiNi0.6Co0.2Mn0.2O2 Cathode Materials at 4.5 V," Acs Applied Materials & Interfaces, vol. 13, Feb. 2021, pp. 10952-10963, XP055954371.

EPO Extended European Search Report dated Sep. 2, 2022, issued in European Patent Application No. 22165926.1 (10 pages).

US Restriction Requirement dated Sep. 23, 2022, issued in U.S. Appl. No. 17/186,502 (6 pages).

Japanese Office Action dated Sep. 11, 2023, issued in Japanese Patent Application No. 2022-128906, 5 pages.

Advisory Action for U.S. Appl. No. 17/102,332 dated Jun. 7, 2022, 3 pages.

Chinese Office Action, with English translation, for Chinese Patent Application No. 201880077888.5 dated Nov. 19, 2021, 22 pgs.

(56) References Cited

OTHER PUBLICATIONS

Duan, Jianguo et al., "Enhanced compacting density and cycling performance of Ni-riched electrode via building mono dispersed micron scaled morphology", *Journal of Alloys and Compounds*, vol. 695 (2017) pp. 91-99.
European Search Report for European Patent Application No. 18885458.2 dated Jul. 23, 2021, 7 pgs.
European Search Report for European Patent Application No. 21170242.8 dated Oct. 15, 2021, 10 pgs.
European Search Report for European Patent Application No. 21206169.1 dated Apr. 8, 2022, 9 pages.
Final Office Action for U.S. Appl. No. 17/102,332 dated Apr. 11, 2022, 7 pages.
International Search Report and Written Opinion for PCT patent application No. PCT/KR2018/015220 dated May 24, 2019, incl. English trans. 22 pgs.
Kim, Yongseon et al., "First-principles and experimental investigation of the morphology of layer-structured LINIO2 and $LiCoO_2$", *Journal of Materials Chemistry*, 2012, vol. 22, pp. 12874-12881.
Korean Intellectual Property Office Notice of Allowance for Korean Patent Application No. 10-2018-0153649 dated Sep. 22, 2020, 5 pgs.
Korean Office Action for Korean Patent Application No. 10-2018-0153649 dated May 21, 2020, 6 pgs.
Korean Office Action for Korean Patent Application No. 10-2020-0124255 dated Feb. 23, 2022, 7 pages.
Notice of Allowance for U.S. Appl. No. 16/209,659 dated Jul. 17, 2020, 8 pages.
Notice of Allowance for U.S. Appl. No. 17/073,124 dated Apr. 8, 2022, 5 pages.
Notice of Allowance for U.S. Appl. No. 17/073,124 dated Feb. 8, 2022, 8 pages.
Notice of Allowance for U.S. Appl. No. 17/102,412 dated Jul. 13, 2022, 5 pages.
Notice of Allowance for U.S. Appl. No. 17/102,412 dated Mar. 24, 2022, 5 pages.
Notice of Allowance for U.S. Appl. No. 17/102,412 dated Dec. 8, 2021, 10 pgs.
Office Action for U.S. Appl. No. 17/073,124 dated Oct. 20, 2021, 7 pages.
Office Action for U.S. Appl. No. 17/102,332 dated Dec. 14, 2021, 9 pages.
Restriction Requirement for U.S. Appl. No. 16/209,659 dated Mar. 27, 2020, 5 pages.
Sun, Yang-Kook, et al., "Synthesis and Characterization of $Li[(Ni_{0.8}Co_{0.1}Mn_{0.1})_{0.8}(Ni_{0.5}Mn_{0.5})_{0.2}]O_2$ with the Microscale Core-Shell Structure as the Positive Electrode Material for Lithium Batteries," J. Am. Chem. Soc., vol. 127, 2005, pp. 13411-13418.
US Office Action dated Nov. 29, 2022, issued in U.S. Appl. No. 17/186,502 (10 pages).
Japanese Office Action dated Dec. 5, 2022, issued in Japanese Patent Application No. 2021-184817 (6 pages).
US Notice of Allowance dated Feb. 1, 2023, issued in U.S. Appl. No. 17/073,124 (5 pages).
US Notice of Allowance dated Feb. 1, 2023, issued in U.S. Appl. No. 17/102,332 (5 pages).
US Notice of Allowance dated Mar. 22, 2023, issued in U.S. Appl. No. 17/186,502 (9 pages).
Chinese Office Action, with English translation, dated Jan. 12, 2024, issued in Chinese Patent Application No. 202111318600.9 (19 pages).
US Notice of Allowance dated May 18, 2023, issued in U.S. Appl. No. 17/529,172 (12 pages).
Notice of Allowance for U.S. Appl. No. 17/073,124 dated Aug. 5, 2022, 5 pages.
Notice of Allowance for U.S. Appl. No. 17/102,332 dated Aug. 17, 2022, 8 pages.
Chinese Office Action dated Jun. 17, 2025, issued in CN Patent Application No. 202210361208.0. (8 pages).
Chinese Office Action corresponding to CN Application No. 202210938027.X, dated Oct. 25, 2025 (8 pages).
Japanese Office Action dated Apr. 7, 2026, issued in corresponding Japanese Patent Application No. 2024-119638 (5 pages).

* cited by examiner

POSITIVE ACTIVE MATERIAL FOR RECHARGEABLE LITHIUM BATTERY, PREPARING METHOD THEREOF AND RECHARGEABLE LITHIUM BATTERY INCLUDING THE SAME

CROSS-REFERENCE TO RELATED APPLICATIONS

This application claims priority to and the benefit of Korean Patent Application No. 10-2021-0107568 filed in the Korean Intellectual Property Office on Aug. 13, 2021, and Korean Patent Application No. 10-2022-0096847 filed in the Korean Intellectual Property Office on Aug. 3, 2022, the entire contents of which are incorporated by reference herein.

BACKGROUND

1. Field

Example embodiments of the present disclosure are related to a positive active material for a rechargeable lithium battery, a preparing method thereof, and a rechargeable lithium battery including the same.

2. Description of the Related Art

Portable information devices (such as cell phones, laptops, smart phones, and/or other portable electronic devices) or electric vehicles have utilized rechargeable lithium batteries having high energy density and easy portability as a driving power source. Recently, research has been actively conducted into utilizing rechargeable lithium batteries with more desirable or suitable high energy density as driving power sources and/or power storage power sources for hybrid or electric vehicles.

Various positive active materials have been investigated to realize rechargeable lithium batteries for use in the above applications. Among them, lithium nickel-based oxide, lithium nickel manganese cobalt composite oxide, lithium nickel cobalt aluminum composite oxide, lithium cobalt oxide, and/or the like are mainly utilized as a positive active material. However, these positive active materials may have structure collapses or cracks during repeated charging and discharging. Thus, the rechargeable lithium battery may exhibit unsatisfactory capacity characteristics due to problems of deterioration and increased resistance over a long-term cycle-life of the rechargeable lithium battery. Accordingly, development of a novel positive active material securing long-term cycle-life characteristics as well as realizing high capacity and high energy density is desired or even required.

SUMMARY

Aspects of one or more embodiments of the present disclosure are directed towards a positive active material for a rechargeable lithium battery with improved cycle-life characteristics and safety while implementing a high capacity, a preparing method thereof, and a rechargeable lithium battery including the same. Additional aspects will be set forth in part in the description which follows and, in part, will be apparent from the description, or may be learned by practice of the presented embodiments of the disclosure.

In one or more embodiments of the present disclosure, a positive active material for a rechargeable lithium battery includes a first positive active material including a first lithium nickel-based composite oxide and including secondary particles formed by aggregation of a plurality of primary particles and a cobalt coating portion on the surface of the secondary particles; and a second positive active material including a second lithium nickel-based composite oxide and including individual particles and a cobalt coating portion on the surface of the individual particles, wherein the second positive active material has an uneven surface including concavo-convex features and an even surface that is substantially flat.

In one or more embodiments of the present disclosure, a method of preparing a positive active material for a rechargeable lithium battery includes mixing a first nickel-based hydroxide and a first lithium raw material and performing a first heat-treatment to prepare a first nickel-based oxide in a form of secondary particles formed by aggregation of a plurality of primary particles; mixing a second nickel-based hydroxide and a second lithium raw material and performing a second heat-treatment to prepare a second nickel-based oxide in an individual particle form; mixing the first nickel-based oxide, the second nickel-based oxide, and a cobalt raw material and performing a third heat-treatment.

In one or more embodiments, a rechargeable lithium battery may include a positive electrode including the positive active material, a negative electrode, and an electrolyte.

According to aspects of one or more embodiments of the present disclosure, the positive active material for a rechargeable lithium battery and a rechargeable lithium battery including the same may exhibit excellent or suitable charge and discharge efficiency, cycle-life characteristics, and safety while realizing a high capacity and high energy density.

DETAILED DESCRIPTION

Figure 1:
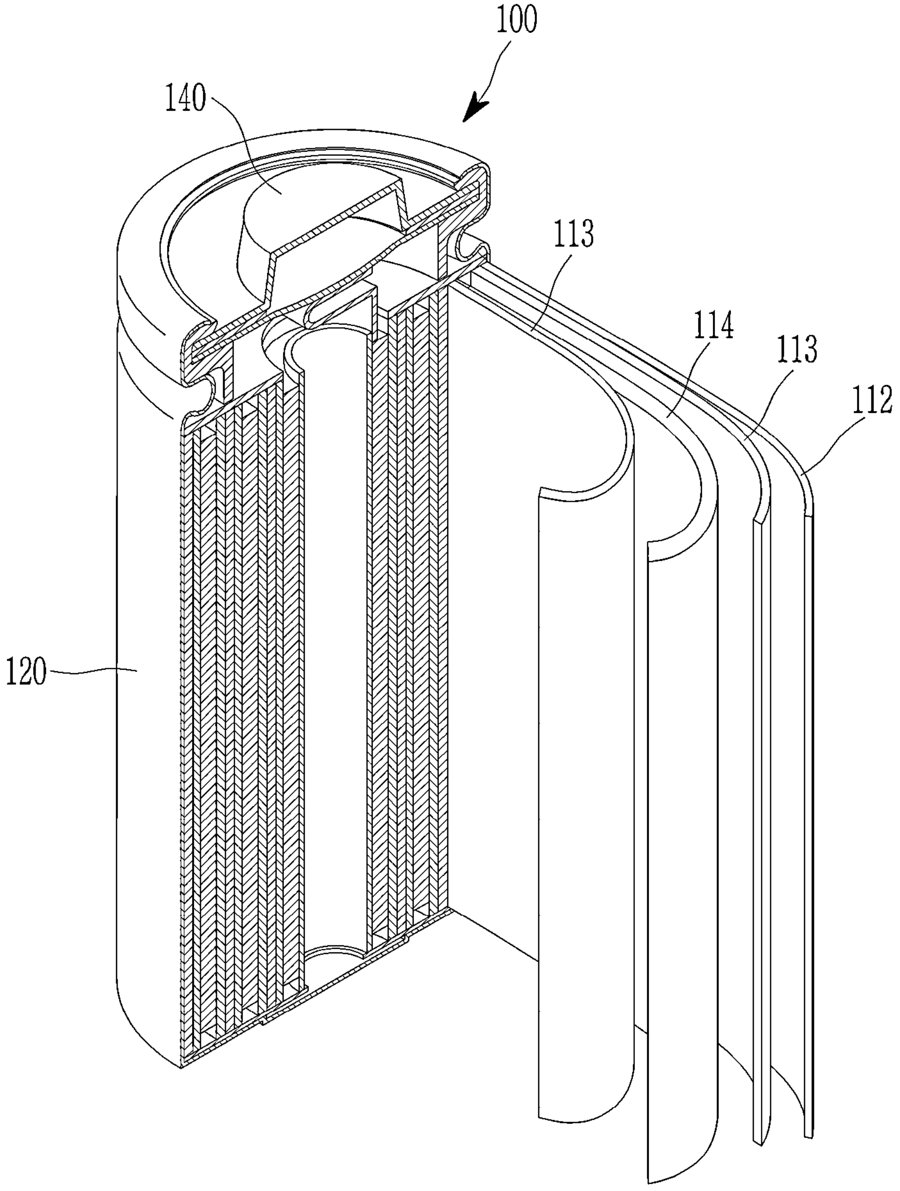
FIG. 1 is a schematic perspective view illustrating a rechargeable lithium battery according to one or more embodiments of the present disclosure.

Hereinafter, specific embodiments will be described in more detail so that those of ordinary skill in the art can easily implement them. However, this disclosure may be embodied in many different forms and is not construed as limited to the example embodiments set forth herein. Rather, these embodiments are provided as examples so that this disclosure will be thorough and complete, and will fully convey the aspects and features of the present disclosure to those skilled in the art.

Accordingly, processes, elements, and techniques that are not necessary to those having ordinary skill in the art for a complete understanding of the aspects and features of the present disclosure may not be described.

The terminology utilized herein is utilized to describe embodiments only, and is not intended to limit the present disclosure. The singular forms "a" and "an" are intended to include the plural forms as well, unless the context clearly dictates otherwise.

As utilized herein, "a combination thereof" refers to a mixture, a laminate, a composite, a copolymer, an alloy, a blend, a reaction product, and/or the like of constituents.

Herein, it should be understood that terms such as "comprises," "includes," or "have" are intended to designate the presence of an embodied feature, number, step, element, or a combination thereof, but it does not preclude the possibility of the presence or addition of one or more other features, number, step, element, or a combination thereof.

In the drawings, the thickness of layers, films, panels, regions, etc., are exaggerated for clarity and like reference numerals designate like elements throughout, and duplicative descriptions thereof may not be provided the specification. It will be understood that when an element such as a layer, film, region, or substrate is referred to as being "on" or "coupled to" another element, it can be directly on or coupled to the other element, or one or more intervening elements may also be present. In contrast, when an element is referred to as being "directly on" another element, there are no intervening elements present. In addition, it will also be understood that when an element or layer is referred to as being "between" two elements or layers, it can be the only element or layer between the two elements or layers, or one or more intervening elements or layers may also be present.

In addition, "layer" herein includes not only a shape formed on the whole surface when viewed from a plan view, but also a shape formed on a partial surface.

In addition, the average particle diameter may be measured by a method well known to those skilled in the art, for example, may be measured by a particle size analyzer, or may be measured by a transmission electron micrograph or a scanning electron micrograph. Alternatively, it is possible to obtain an average particle diameter value by measuring using a dynamic light scattering method, performing data analysis, counting the number of particles for each particle size range, and calculating from this. Unless otherwise defined, the average particle diameter may refer to the diameter (D50) of particles having a cumulative volume of 50 volume % in the particle size distribution.

Herein, "or" is not to be construed as an exclusive meaning, for example, "A or B" is construed to include A, B, A+B, and the like. As used herein, the term "and/or" includes any and all combinations of one or more of the associated listed items. Expressions such as "at least one of," "a plurality of," "one of," and other prepositional phrases, when preceding a list of elements, should be understood as including the disjunctive if written as a conjunctive list and vice versa. For example, the expressions "at least one of a, b, or c," "at least one of a, b, and c," "one selected from the group consisting of a, b, and c," "at least one selected from a, b, and c," "at least one from among a, b, and c," "one from among a, b, and c", "at least one of a to c" indicates only a, only b, only c, both a and b, both a and c, both b and c, all of a, b, and c, or variations thereof.

Spatially relative terms, such as "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

As used herein, the term "substantially," "about," and similar terms are used as terms of approximation and not as terms of degree, and are intended to account for the inherent deviations in measured or calculated values that would be recognized by those of ordinary skill in the art. "Substantially" as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "substantially" or "about" may mean within one or more standard deviations, or within ±30%, 20%, 10%, 5% of the stated value. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Positive Active Material

In one or more embodiments, a first positive active material including a lithium nickel-based composite oxide, in the form of secondary particles formed by aggregation of a plurality of primary particles, and including a cobalt coating portion on a surface of the secondary particles, and a second positive active material including a lithium nickel-based composite oxide, in the form of a single particle (e.g., in individual, separate particles), and including a cobalt coating portion on a surface of the single particle (e.g., the individual, separate particles), wherein the second positive active material has an uneven surface having unevenness (e.g., a concavo-convex surface) and an even surface without unevenness (e.g., a substantially flat surface). Such a positive active material may exhibit improved cycle-life characteristics while implementing high capacity and high energy density.

First Positive Active Material

The first positive active material has a polycrystal form, and includes secondary particles formed by aggregation of at least two or more primary particles.

The first positive active material according to one or more embodiments includes a cobalt coating portion on the surface of the secondary particles. The cobalt coating portion may be disposed on the whole or at least a portion of the surface of the secondary particle. The first positive active material is coated with cobalt and thus effectively suppressing or reducing structural collapse due to repetitive charges and discharges, and accordingly, room temperature and high temperature cycle-life characteristics may be improved.

The cobalt coating portion includes a cobalt-containing compound. The cobalt-containing compound may be, for example, cobalt oxide, cobalt hydroxide, cobalt carbonate, a composite thereof, and/or a mixture thereof, and these may further include lithium and/or nickel. For example, the cobalt-containing compound may be lithium cobalt oxide.

The amount of the cobalt coating portion in the first positive active material may be about 0.01 mol % (e.g., 0.01% of the first positive active material is the cobalt coating portion per mole of the first positive active material) to about 7 mol %, for example, about 0.01 mol % to about 6 mol %, about 0.1 mol % to about 5 mol %, about 0.5 mol % to about 4 mol %, about 1 mol % to about 5 mol %, or about 2 mol % to about 5 mol %, and may be also be about 0.01 atom % (e.g., 0.01% of the atomic weight of the first positive active material is the cobalt coating portion) to about 7 atom %, about 0.1 atom % to about 5 atom %, or about 0.5 atom % to about 4 atom % based on the total amount of the first positive active material. In this case, the rechargeable lithium battery including the first positive active material may implement excellent or suitable room temperature and high temperature cycle-life characteristics.

The thickness of the cobalt coating portion in the first positive active material is variable depending on the firing temperature during coating, and cobalt may penetrate into the active material and be coated and/or doped according to the firing temperature. Accordingly, the thickness of the cobalt coating layer may be, for example, about 1 nm to about 2 μm, about 1 nm to about 1.5 μm, about 1 nm to about 1 μm, about 1 nm to about 900 nm, about 1 nm to about 700 nm, about 1 nm to about 500 nm, about 1 nm to about 300 nm, about 5 nm to about 100 nm, or about 5 nm to about 50 nm. In this case, the rechargeable lithium battery including the first positive active material may exhibit excellent or suitable room temperature and high temperature cycle-life characteristics.

The average particle diameter of the first positive active material, that is, the average particle diameter of the secondary particles may be about 7 μm to about 25 μm. For example, it may be about 9 μm to about 25 μm, about 9 μm to about 25 μm, about 15 μm to about 25 μm, or about 10 μm to about 20 μm. The average particle diameter of the secondary particles of the first positive active material may be equal to or larger than the average particle diameter (or size) of the second positive active material having a single particle form (e.g., individual, separate particle forms), which will be described in more detail later. The positive active material according to one or more embodiments may be in the form of a mixture of a first positive active material, which is polycrystalline and large particles, and a second positive active material, which has a single particle form (e.g., individual, separate particle forms) and small particles, thereby improving a mixture density, and providing high capacity and high energy density.

Herein, the average particle diameter refers to the diameter (particle size) of particles having a cumulative volume of 50 volume % in the particle size distribution (e.g., the median particle diameter or size, where the median is the value of the particle diameter or size at 50% in the cumulative distribution), that is, D50. The average particle diameter may be measured through electron micrographs such as a scanning electron microscope and a transmission electron microscope. For example, in the scanning electron micrograph of the positive active material, 30 particles in the form of secondary particles are randomly selected, their sizes (particle diameter or the length of the long axis) are measured to obtain a particle size distribution, and D50 is calculated to obtain the average (e.g., median) particle diameter of the first positive active material.

The first positive active material is a nickel-based positive active material, and includes a lithium nickel-based composite oxide (or a first nickel-based oxide). The nickel content (e.g., the amount of nickel) in the lithium nickel-based composite oxide may be greater than or equal to about 30 mol % (e.g., 30% nickel per mole of the lithium nickel-based composite oxide), for example greater than or equal to about 40 mol %, greater than or equal to about 50 mol %, greater than or equal to about 60 mol %, greater than or equal to about 70 mol %, greater than or equal to about 80 mol %, or greater than or equal to about 90 mol % and less than or equal to about 99.9 mol %, or less than or equal to about 99 mol % based on the total amount of elements excluding lithium and oxygen. For example, the nickel content (e.g., amount) in the lithium nickel-based composite oxide may be higher than the content (e.g., amount) of each of other metals such as cobalt, manganese, and/or aluminum. When the nickel content (e.g., amount) satisfies the above range, the positive active material may exhibit excellent or suitable battery performance while realizing a high capacity.

For example, the first positive active material may include a lithium nickel-based composite oxide represented by Chemical Formula 1.

$$Li_{a1}Ni_{x1}M^1_{y1}M^2_{1-x1-y1}O_2 \quad \text{Chemical Formula 1}$$

In Chemical Formula 1, $0.9 \le a1 \le 1.8$, $0.3 \le x1 \le 1$, $0 \le y1 \le 0.7$, and $M^1$ and $M^2$ may each independently be Al, B, Ba, Ca, Ce, Co, Cr, Cu, F, Fe, Mg, Mn, Mo, Nb, P, S, Si, Sr, Ti, V, W, Zr, or a combination thereof.

In Chemical Formula 1, $0.4 \leq x1 \leq 1$ and $0 \leq y1 \leq 0.6$, $0.5 \leq x1 \leq 1$ and $0 \leq y1 \leq 0.5$, $0.6 \leq x1 \leq 1$ and $0 \leq y1 \leq 0.4$, $0.7 \leq x1 \leq 1$ and $0 \leq y1 \leq 0.3$, $0.8 \leq x1 \leq 1$ and $0 \leq y1 \leq 0.2$, or $0.9 \leq x1 \leq 1$ and $0 \leq y1 \leq 0.1$.

The first positive active material may include, for example, a lithium nickel-based composite oxide represented by Chemical Formula 2.

$Li_{a2}Ni_{x2}Co_{y2}M^3_{1-x2-y2}O_2$ Chemical Formula 2

In Chemical Formula 2, $0.9 \leq a2 \leq 1.8$, $0.3 \leq x2 \leq 1$, $0 \leq y2 \leq 0.7$, and $M^3$ is Al, B, Ba, Ca, Ce, Cr, F, Fe, Mg, Mn, Mo, Nb, P, S, Si, Sr, Ti, V, W, Zr, or a combination thereof.

In Chemical Formula 2, $0.3 \leq x2 \leq 0.99$ and $0.01 \leq y2 \leq 0.7$, $0.4 \leq x2 \leq 0.99$ and $0.01 \leq y2 \leq 0.6$, $0.5 \leq x2 \leq 0.99$ and $0.01 \leq y2 \leq 0.5$, $0.6 \leq x2 \leq 0.99$ and $0.01 \leq y2 \leq 0.4$, $0.7 \leq x2 \leq 0.99$ and $0.01 \leq y2 \leq 0.3$, $0.8 \leq x2 \leq 0.99$ and $0.01 \leq y2 \leq 0.2$, or $0.9 \leq x2 \leq 0.99$ and $0.01 \leq y2 \leq 0.1$.

The first positive active material may include, for example, a compound represented by Chemical Formula 3.

$Li_{a3}Ni_{x3}Co_{y3}M^4_{z3}M^5_{1-x3-y3-z3}O_2$ Chemical Formula 3

In Chemical Formula 3, $0.9 \leq a3 \leq 1.8$, $0.3 \leq x3 \leq 0.98$, $0.01 \leq y3 \leq 0.69$, $0.01 \leq z3 \leq 0.69$, $M^4$ is Al, Mn, or a combination thereof, and $M^5$ is B, Ba, Ca, Ce, Cr, F, Fe, Mg, Mo, Nb, P, S, Si, Sr, Ti, V, W, Zr, or a combination thereof.

In Chemical Formula 3, $0.4 \leq x3 \leq 0.98$, $0.01 \leq y3 \leq 0.59$, and $0.01 \leq z3 \leq 0.59$, $0.5 \leq x3 \leq 0.98$, $0.01 \leq y3 \leq 0.49$, and $0.01 \leq z3 \leq 0.49$, $0.6 \leq x3 \leq 0.98$, $0.01 \leq y3 \leq 0.39$, and $0.01 \leq z3 \leq 0.39$, $0.7 \leq x3 \leq 0.98$, $0.01 \leq y3 \leq 0.29$, and $0.01 \leq z3 \leq 0.29$, $0.8 \leq x3 \leq 0.98$, $0.01 \leq y3 \leq 0.19$, and $0.01 \leq z3 \leq 0.19$, or $0.9 \leq x3 \leq 0.98$, $0.01 \leq y3 \leq 0.09$, and $0.01 \leq z3 \leq 0.09$.

In one or more embodiments, a maximum roughness of the surface of the first positive active material may be, for example, about 3 nm to about 100 nm, about 5 nm to about 50 nm, about 3 nm to about 15 nm, or about 3 nm to about 10 nm, an average roughness may be about 0.2 nm to about 10 nm, about 0.5 nm to about 3 nm, about 0.2 nm to about 1.5 nm, or about 0.2 nm to about 1 nm, and a root mean square roughness may be about 0.5 nm to about 10 nm, about 0.7 nm to about 3 nm, about 0.5 nm to about 2 nm, or about 0.5 nm to about 1.5 nm. Details of the meanings and measurement methods of the maximum roughness, the average roughness, and the root mean square roughness will be described in more detail later in the second positive active material.

Second Positive Active Material

The second positive active material is in a single particle form (e.g., individual, separate particle forms), wherein the single particle form refers to one single particle (e.g., individual, separate and non-aggregated particles) being present alone without a grain boundary there inside, and a monolithic structure, an one body or non-agglomerated particle in which particles are not aggregated with one another but present as an independent phase in terms of morphology, and may be, for example, a single crystal (e.g., individual, separate, non-aggregated crystals). The positive active material according to embodiments may exhibit improved cycle-life characteristics while implementing high capacity and high energy density by including the second positive active material.

The second positive active material has no particular limit to a shape but may have one or more suitable shapes such as a polyhedron, an oval, a plate, a rod, an irregular shape, and/or any other suitable shape. The single-crystal (e.g., individual, separate crystals) second positive active material according to one or more embodiments may have a polyhedral structure having two or more surfaces.

The second positive active material according to one or more embodiments includes a cobalt coating portion on the surface of the single particle (e.g., the individual, separate particles). Because the second positive active material is coated with cobalt and thus effectively suppressing or reducing structural collapse due to repeated charges and discharges, room temperature and high temperature cycle-life characteristics may be improved.

The cobalt coating portion includes a cobalt-containing compound. The cobalt-containing compound may be, for example, cobalt oxide, cobalt hydroxide, cobalt carbonate, a composite thereof, or a mixture thereof, and may further include lithium and/or nickel. For example, the cobalt-containing compound may be lithium cobalt oxide and/or any other suitable cobalt-containing compound.

A method of preparing the positive active material according to one or more embodiments, which is described in more detail later, may be performed by not separately coating the first positive active material and the second positive active material, but mixing the first nickel-based oxide and second nickel-based oxide, and a cobalt raw material and performing a third heat-treatment to concurrently (e.g., simultaneously) coat (or concurrently (e.g., simultaneously) fire). According to this method, cobalt is effectively coated on only a portion of the crystal surface of the single-crystal (e.g., the individual, separate crystals) second positive active material, and unevenness occurs in this portion. Accordingly, one single particle (e.g., the individual, separate particles) of the second positive active material includes both (e.g., simultaneously includes) an uneven surface having a rough shape (e.g., a concavo-convex shape or surface) due to unevenness of a specific shape (e.g., a surface with peaks and valleys) and an even or smooth surface (e.g., a substantially flat surface or a surface substantially without peaks and valleys). It is understood that the cobalt is effectively coated only on the crystal surface where lithium ions enter and exit easily, so that unevenness occurs. The surface roughness of the second positive active material increases on a specific surface, and the second positive active material and the positive active material including the same may have increased specific surface area. A rechargeable lithium battery including such a positive active material may have improved initial discharge capacity, charge/discharge efficiency, and/or cycle-life characteristics.

The unevenness on the uneven surface may be linear or irregular. In one or more embodiments, the uneven surface may be expressed as a shape in which the cobalt-containing compound is linearly or irregularly attached, or a shape in which the cobalt-containing compound covers the surface of the single particle (e.g., the individual, separate particles) in an irregular shape. This shape is distinct from island-type or kind coatings.

One single particle (e.g., the individual, separate particles) of the second positive active material may include an uneven surface having a high surface roughness and an even surface having a low surface roughness. For example, in the second positive active material, the uneven surface has a high surface roughness. Maximum roughness (e.g., $R_{max}$, peak to peak height, or maximum roughness depth) may be a vertical distance between the highest peak and the lowest valley within a reference length of a roughness cross-section curve (roughness profile).

Average roughness ($R_a$) of the surface roughness is also called to as center line average roughness, which is obtained as an arithmetic average of absolute values of ordinates (length from center to peak) within the reference length of the roughness profile. Root mean square roughness ($R_q$) may be a root average square (rms) of vertical values within the reference length of the roughness profile. As for such surface roughness, parameters and measurement methods defined in KS B 0601 or ISO 4287/1 may be referred to.

The uneven surface of the second positive active material may have a maximum roughness (e.g., $R_{max}$ or peak to peak height) of greater than or equal to about 18 nm, for example, greater than or equal to about 20 nm, about 18 nm to about 100 nm, about 18 nm to about 80 nm, about 19 nm to about 60 nm, or about 20 nm to about 40 nm. In such embodiments, the positive active material for a rechargeable lithium battery including the second positive active material exhibits high energy density and high capacity, and may implement excellent or suitable charge/discharge efficiency and cycle-life characteristics.

The uneven surface of the second positive active material may have an average roughness ($R_a$) of greater than or equal to about 1.9 nm, for example greater than or equal to about 2.0 nm, about 1.9 nm to about 10 nm, about 1.9 nm to about 8.0 nm, about 1.9 nm to about 6.0 nm, about 1.9 nm to about 5.0 nm, or about 2.0 nm to about 10 nm. In such embodiments, the positive active material for a rechargeable lithium battery including the second positive active material may exhibit high energy density and high capacity, and may implement excellent or suitable charge/discharge efficiency and cycle-life characteristics.

The uneven surface of the second positive active material may have a root mean square roughness ($R_q$) of greater than or equal to about 2.3 nm, for example greater than or equal to about 2.4 nm, about 2.3 nm to about 10 nm, about 2.3 nm to about 8 nm, about 2.3 nm to about 6 nm, about 2.3 nm to about 5 nm, or about 2.4 nm to about 10 nm. In such embodiments, the positive active material for a rechargeable lithium battery including the second positive active material exhibits high energy density and high capacity, and may implement excellent or suitable charge/discharge efficiency and cycle-life characteristics.

On the other hand, the even surface of the second positive active material may exhibit a lower surface roughness than the uneven surface. For example, the even surface of the second positive active material may have a maximum roughness ($R_{max}$) of less than or equal to about 15 nm, for example, about 0.1 nm to about 14 nm, or about 1 nm to about 13 nm. In one or more embodiments, the even surface of the second positive active material may have an average roughness ($R_a$) of less than or equal to about 1.8 nm, for example, about 0.1 nm to about 1.8 nm, or about 0.5 nm to about 1.7 nm. The even surface of the second positive active material may have a root mean square roughness ($R_q$) of less than or equal to about 2.2 nm, for example, about 0.1 nm to about 2.2 nm, or about 0.5 nm to about 2.1 nm.

As described above, the second positive active material including both (e.g., simultaneously) the uneven surface and the even surface may have a stable structure without collapse of the structure due to charging and discharging of the battery, and may exhibit excellent or suitable cycle-life characteristics while implementing high capacity and high energy density.

The content (e.g., amount) of the cobalt coating portion in the second positive active material may be about 0.01 mol % to about 10 mol %, for example about 0.05 mol % to about 9 mol %, about 0.1 mol % to about 8 mol %, about 0.5 mol % to about 7 mol %, or about 1 mol % to about 6 mol %, and may be also be about 0.01 atom % to about 10 atom %, about 0.1 atom % to about 8 atom %, or about 0.5 atom % to about 6 atom % based on the total amount of the second positive active material. In such embodiments, the rechargeable lithium battery including the second positive active material may implement excellent or suitable room temperature and high temperature cycle-life characteristics.

A ratio of the uneven surface to the total surface area of the second positive active material may be about 40% to about 80%, for example, about 45% to about 80%, or about 50% to about 75%. In one or more embodiments, a ratio of the even surface to the entire surface of the second positive active material may be about 20% to about 60%, for example, about 20% to about 55%, or about 25% to about 50%. The second positive active material includes the uneven surface and the even surface in this ratio and thus may realize high capacity and concurrently (e.g., simultaneously), exhibit high cycle-life characteristics.

The thickness of the cobalt coating portion in the second positive active material may be about 1 nm to about 2 μm, for example, about 1 nm to about 1 μm, about 1 nm to about 900 nm, about 1 nm to about 700 nm, about 1 nm to about 500 nm, about 1 nm to about 300 nm, about 5 nm to about 100 nm, or about 5 nm to about 50 nm. In such embodiments, the rechargeable lithium battery including the second positive active material may exhibit excellent or suitable room temperature and high temperature cycle-life characteristics. The thickness of the cobalt coating portion may be measured through an electron micrograph of the positive active material.

On the other hand, the second positive active material may have sides having different cobalt contents (e.g., amounts or concentrations). In other words, the second positive active material may have a side having a high cobalt content (e.g., amount) and another side having a low cobalt content (e.g., amount) in one single particle (e.g., in the individual, separate particles). For example, the cobalt content (e.g., amount) at the side having a high cobalt content (e.g., amount) may be 30 at % (e.g., 30 percent of the atomic weight) to 70 at % or 35 at % to 65 at % based on the total content (e.g., amount) of all transition metals excluding lithium. The cobalt content (e.g., amount) at the side having a low cobalt content (e.g., amount) may be about 1 at % to about 30 at %, or about 3 at % to about 25 at % based on the total content (e.g., amount) of all transition metals excluding lithium. In one or more embodiments, a ratio of the side having the high cobalt content (e.g., amount) in one single particle (e.g., in the individual, separate particles) may be about 20% to about 50%, and a ratio of the side having the low cobalt content (e.g., amount) in one single particle (e.g., in the individual, separate particles) may be about 50% to about 80%. In such embodiments, the second positive active material may improve capacity characteristics and cycle-life characteristics of a battery.

The average particle diameter of the second positive active material, that is, the average particle diameter of the single particle (e.g., the individual, separate particles) may be about 0.05 μm to about 10 μm, for example about 0.1 μm to about 8 μm, about 0.1 μm to about 7 μm, about 0.1 μm to about 6 μm, about 0.1 μm to about 10 μm, or, for example, about 1 μm to about 5 μm. The average particle diameter of the second positive active material may be the same as or smaller than that of the first positive active material, and thus the density of the positive active material may be further increased. Herein, the average particle diameter refers to the diameter of particles having a cumulative volume of 50 volume % in the particle size distribution (e.g., the median particle diameter, where particle diameter can refer to the average width in varying particle shapes, and where the median is the value of the particle diameter at 50% in the cumulative distribution), that is, D50. For example, in the scanning electron micrograph of the positive active material, 30 particles in the single particle form (e.g., in the individual, separate particle forms) are randomly selected, their sizes (particle diameter or the length of the long axis) are measured to obtain a particle size distribution, and D50 is calculated to obtain the average (e.g., median) particle diameter of the second positive active material.

The BET specific surface area (e.g., surface area calculated according to the Brunauer, Emmett and Teller theory) of the entire positive active material including the first positive active material and the second positive active material may be about 0.2 $m^2/g$ to about 0.6 $m^2/g$, for example, about 0.3 $m^2/g$ to about 0.5 $m^2/g$, or about 0.3 $m^2/g$ to about 0.4 $m^2/g$. In such embodiments, the positive active material may realize excellent or suitable charge/discharge efficiency and cycle-life characteristics. The BET specific surface area may be measured by a nitrogen gas adsorption method utilizing, for example, a specific surface area measuring device ASAP 2020 manufactured by Micromeritics. For example, about 0.4 g of a positive active material sample may be filled in a cell, pre-treated by heating to 220° C., cooled to a temperature of liquid nitrogen, and saturation adsorbed with gas of 30% nitrogen and 70% helium, and then up to room temperature to measure the amount of desorbed gas. From the obtained results, the specific surface area may be calculated by a BET method.

The second positive active material includes a lithium nickel-based composite oxide (or a second nickel-based oxide) as a nickel-based active material. The nickel content (e.g., amount) in the lithium nickel-based composite oxide may be greater than or equal to about 30 mol %, for example greater than or equal to about 40 mol %, greater than or equal to about 50 mol %, greater than or equal to about 60 mol %, greater than or equal to about 70 mol %, greater than or equal to about 80 mol %, or greater than or equal to about 90 mol % and less than or equal to about 99.9 mol %, or less than or equal to about 99 mol % based on the total amount of elements excluding lithium and oxygen. For example, the nickel content (e.g., amount) in the lithium nickel-based composite oxide may be higher than each content (e.g., amount) of other transition metals such as cobalt, manganese, and aluminum. When the nickel content (e.g., amount) satisfies the above range, the positive active material may exhibit excellent or suitable battery performance while realizing a high capacity.

The second positive active material may include for example a lithium nickel-based composite oxide represented by Chemical Formula 11.

$$Li_{a11}Ni_{x11}M^{11}_{y11}M^{12}_{1-x11-y11}O_2 \quad \text{Chemical Formula 11}$$

In Chemical Formula 11, $0.9 \le a11 \le 1.8$, $0.3 \le x11 \le 1$, $0 \le y11 \le 0.7$, $M^{11}$ and $M^{12}$ may each independently be Al, B, Ba, Ca, Ce, Co, Cr, Cu, F, Fe, Mg, Mn, Mo, Nb, P, S, Si, Sr, Ti, V, W, Zr, or a combination thereof.

In Chemical Formula 11, $0.4 \le x11 \le 1$ and $0 \le y11 \le 0.6$, $0.5 \le x11 \le 1$ and $0 \le y11 \le 0.5$, $0.6 \le x11 \le 1$ and $0 \le y11 \le 0.4$, $0.7 \le x11 \le 1$ and $0 \le y11 \le 0.3$, $0.8 \le x11 \le 1$ and $0 \le y11 \le 0.2$, or $0.9 \le x11 \le 1$ and $0 \le y11 \le 0.1$.

The second positive active material may include for example a lithium nickel-based composite oxide represented by Chemical Formula 12.

$$Li_{a12}Ni_{x12}Co_{y12}M^{13}_{1-x12-y12}O_2 \quad \text{Chemical Formula 12}$$

In Chemical Formula 12, $0.9 \le a12 \le 1.8$, $0.3 \le x12 \le 1$, $0 \le y12 \le 0.7$ and $M^{13}$ is Al, B, Ba, Ca, Ce, Cr, Cu, F, Fe, Mg, Mn, Mo, Nb, P, S, Si, Sr, Ti, V, W, Zr, or a combination thereof.

In Chemical Formula 12, $0.3 \le x12 \le 0.99$ and $0.01 \le y12 \le 0.7$, $0.4 \le x12 \le 0.99$ and $0.01 \le y12 \le 0.6$, $0.5 \le x12 \le 0.99$ and $0.01 \le y12 \le 0.5$, $0.6 \le x12 \le 0.99$ and $0.01 \le y12 \le 0.4$, $0.7 \le x12 \le 0.99$ and $0.01 \le y12 \le 0.3$, $0.8 \le x12 \le 0.99$ and $0.01 \le y12 \le 0.2$, or $0.9 \le x12 \le 0.99$ and $0.01 \le y12 \le 0.1$.

As a specific example, the second positive active material may include a lithium nickel cobalt composite oxide represented by Chemical Formula 13.

$$Li_{a13}Ni_{x13}Co_{y13}M^{14}_{z13}M^{15}_{1-x13-y13-z13}O_2 \quad \text{Chemical Formula 13}$$

In Chemical Formula 13, $0.9 \le a13 \le 1.8$, $0.3 \le x13 \le 0.98$, $0.01 \le y13 \le 0.69$, $0.01 \le z13 \le 0.69$, $M^{14}$ is Al, Mn, or a combination thereof, and $M^{15}$ is B, Ba, Ca, Ce, Cr, Cu, F, Fe, Mg, Mo, Nb, P, S, Si, Sr, Ti, V, W, Zr, or a combination thereof.

In Chemical Formula 13, $0.4 \le x13 \le 0.98$, $0.01 \le y13 \le 0.59$, and $0.01 \le z13 \le 0.59$, $0.5 \le x13 \le 0.98$, $0.01 \le y13 \le 0.49$, and $0.01 \le z13 \le 0.49$, $0.6 \le x13 \le 0.98$, $0.01 \le y13 \le 0.39$, and $0.01 \le z13 \le 0.39$, $0.7 \le x13 \le 0.98$, $0.01 \le y13 \le 0.29$, and $0.01 \le z13 \le 0.29$, $0.8 \le x13 \le 0.98$, $0.01 \le y13 \le 0.19$, and $0.01 \le z13 \le 0.19$, or $0.9 \le x13 \le 0.01 \le y13 \le 0.09$, and $0.01 \le z13 \le 0.09$.

In the positive active material according to one or more embodiments, the first positive active material may be included in an amount of about 50 wt % to about 90 wt %, and the second positive active material may be included in an amount of about 10 wt % to about 50 wt % based on the total amount of the first positive active material and the second positive active material. The first positive active material may be for example included in an amount of about 60 wt % to about 90 wt %, or about 70 wt % to about 90 wt % and the second positive active material may be for example included in an amount of about 10 wt % to about 40 wt %, or about 10 wt % to about 30 wt %. When the content (e.g., amount) ratio of the first positive active material and the second positive active material is as described above, the positive active material including the same may realize high capacity, improve a mixture density, and exhibit high energy density.

Method of Preparing Positive Active Material

In one or more embodiments, a method of preparing a positive active material for a rechargeable lithium battery includes mixing a first nickel-based hydroxide and a lithium raw material and performing a first heat-treatment to prepare a first nickel-based oxide, mixing a second nickel-based hydroxide and a lithium raw material and performing a second heat-treatment to prepare a second nickel-based oxide, and mixing the first nickel-based oxide and the second nickel-based oxide, and a cobalt raw material and performing a third heat-treatment to prepare a final positive active material including a first positive active material and a second positive active material.

Herein, the first nickel-based oxide and first positive active material has a form of secondary particles formed by aggregation of a plurality of primary particles and the second nickel-based oxide and second positive active material has a single particle form (e.g., individual, separate particle forms). The first positive active material may be a material in which the first nickel-based oxide is coated with cobalt on the surface, and the second positive active material may be a material in which the second nickel-based oxide is coated with cobalt on the surface.

In one or more embodiments, the first positive active material and the second positive active material may be prepared by not individually coating the first nickel-based oxide and the second nickel-based oxide but concurrently (e.g., simultaneously) coating them after first mixing them. Accordingly, the cobalt-coated single-crystal (e.g., individual, separate crystals) second positive active material has both (e.g., simultaneously) an uneven surface and a smooth even surface, and thus has a high surface roughness and a high specific surface area. Accordingly, a positive active material for a rechargeable lithium battery including this second positive active material may exhibit a high specific surface area and thus realize excellent or suitable capacity characteristics and cycle-life characteristics.

The first nickel-based hydroxide and the second nickel-based hydroxide are precursors of the positive active material and may each independently be a nickel hydroxide, a nickel-based composite hydroxide containing an element other than nickel, or a nickel-transition elements composite hydroxide containing a transition metal other than nickel.

For example, the first nickel-based hydroxide and second nickel-based hydroxide may each independently be represented by Chemical Formula 21.

$$Ni_{x21}M^{21}_{y21}M^{22}_{1-x21-y21}(OH)_2 \quad \text{Chemical Formula 21}$$

In Chemical Formula 21, $0.3 \leq x21 \leq 1$, $0 \leq y21 \leq 0.7$, $M^{21}$ and $M^{22}$ may each independently be Al, B, Ba, Ca, Ce, Co, Cr, Cu, F, Fe, Mg, Mn, Mo, Nb, P, S, Si, Sr, Ti, V, W, Zr, or a combination thereof.

The first nickel-based hydroxide may have an average particle diameter of about 7 μm to about 25 μm, for example, about 10 μm to about 25 μm, about 15 μm to about 25 μm, or about 10 μm to about 20 μm. The second nickel-based hydroxide may have an average particle diameter of about 0.05 μm to about 10 μm, for example, about 0.1 μm to about 9 μm, about 0.5 μm to about 8 μm, or about 1 μm to about 7 μm. Here, the particle size of the first nickel-based hydroxide is analyzed through a particle size analyzer by laser diffraction method, and may refer to, for example, D50.

The lithium raw material is a lithium source of the positive active material and may include, for example, $Li_2CO_3$, LiOH, a hydrate thereof, or a combination thereof.

When the first nickel-based hydroxide is mixed with the lithium raw material, a ratio of a mole number of lithium in the lithium raw material relative to a mole number of metals included in the first nickel-based hydroxide, for example, may be greater than or equal to about 0.8, greater than or equal to about 0.85, greater than or equal to about 0.9, greater than or equal to about 0.95, or greater than or equal to about 1.0 and less than or equal to about 1.8, less than or equal to about 1.5, less than or equal to about 1.2, less than or equal to about 1.1, or less than or equal to about 1.05.

The first heat-treatment may be performed under an oxidizing gas atmosphere, for example, under an oxygen atmosphere or the air atmosphere. In one or more embodiments, the first heat-treatment may be performed at about 600° C. to about 900° C. or about 600° C. to about 800° C., for example, for about 5 hours to about 20 hours, for example 5 hours to 15 hours. The first nickel-based oxide obtained through the first heat-treatment may be referred to as a first lithium nickel-based oxide.

When the second nickel-based hydroxide is mixed with the lithium raw material, a ratio of a mole number of lithium in the lithium raw material relative to a mole number of a metal included in the second nickel-based hydroxide may be, for example, greater than or equal to about 0.8, greater than or equal to about 0.85, greater than or equal to about 0.9, greater than or equal to about 0.95, or greater than or equal to about 1.0 and less than or equal to about 1.8, less than or equal to about 1.5, less than or equal to about 1.2, less than or equal to about 1.1, or less than or equal to about 1.05.

The second heat-treatment also may be performed under the oxidizing gas atmosphere, for example, under the oxygen atmosphere or under the air atmosphere. In one or more embodiments, the second heat-treatment may be performed, for example, at about 800° C. to about 1100° C., or about 900° C. to about 1000° C., for example, for about 5 hours to about 20 hours or about 5 hours to about 15 hours. The second nickel-based oxide obtained through the second heat-treatment may be referred to as a second lithium nickel-based oxide.

The second nickel-based oxide has a single particle form (e.g., individual, separate particle forms), which may be obtained through adjustment of conditions such as a temperature, time, and/or the like of the second heat-treatment or through one or more suitable conditions during synthesis of the second nickel-based hydroxide in a co-precipitation method.

The method of preparing a positive active material for a rechargeable lithium battery may further include pulverizing a product obtained after mixing and secondarily heat-treating the second nickel-based hydroxide and the lithium raw material, thereby obtaining the single-crystal (e.g., the individual, separate crystals of the) second nickel-based oxide. The pulverization may be performed by utilizing one or more suitable pulverizing devices such as a jet mill and/or the like. Herein, the pulverization of the obtained product is a process of obtaining a single-crystal (e.g., individual, separate crystals) active material, which is distinguished from the crushing of a general active material.

When the first nickel-based oxide is mixed with the second nickel-based oxide, the first nickel-based oxide and the second nickel-based oxide may have a weight ratio of about 9:1 to about 5:5, for example, about 9:1 to about 6:4, or about 8:2 to about 7:3. When the first nickel-based oxide and the second nickel-based oxide are mixed within the aforementioned range, the obtained positive active material may exhibit high-capacity high energy density and high electrode plate density.

Subsequently, the first nickel-based oxide and the second nickel-based oxide are mixed with a cobalt raw material and then, thirdly heat-treated for cobalt coating. The cobalt coating may be performed either dry or wet. For example, the first nickel-based oxide, the second nickel-based oxide, and the cobalt raw material are mixed without a solvent and then, heat-treated for dry coating.

The cobalt raw material may be, for example, cobalt sulfate, cobalt oxide, cobalt nitrate, and/or any other suitable cobalt compound.

The cobalt raw material may be mixed to include cobalt in an amount of about 0.01 parts by mole to about 7 parts by mole, about 0.01 parts by mole to about 5 parts by mole, or about 0.1 parts by mole to about 4 parts by mole, based on 100 parts by mole of the total amount of metals excluding lithium in the total positive active material.

Herein, while the cobalt raw material is added, a lithium-containing compound such as lithium hydroxide and/or any other suitable lithium-containing compound may be added thereto. Herein, the lithium-containing compound may be added in an amount of 0.01 parts by mole to 5 parts by mole, or 0.1 parts by mole to 3 parts by mole based on 100 parts by mole of a total metal content (e.g., amount) of the positive active material. The lithium-containing compound may be added in an amount of 1 mole part to 4 mole parts per (or based on) 1 mole part of the cobalt raw material added together, for example, 1.5 mole parts to 3 mole parts. For example, the lithium raw material may be added at 1 to 4 times, or 1.5 to 3 times the amount of the cobalt raw material.

In one or more embodiments, the first nickel-based oxide and the second nickel-based oxide may be added to a solvent such as distilled water and/or any other suitable solvent for washing while mixing, and the cobalt raw material may be added dropwise thereto to perform wet coating and then, thirdly heat-treated. In one or more embodiments, while the cobalt raw material is added thereto, the lithium-containing compound such as lithium hydroxide and/or any other suitable lithium-containing compound and/or a pH-controlling agent such as sodium hydroxide and/or any other suitable pH-controlling agent may be added thereto.

The amount of the lithium-containing compound is the same as described above. The pH-controlling agent may be added in an amount of 0.5 to 5 mole parts per (or based on) 1 mole part of the cobalt raw material. The cobalt coating according to one or more embodiments can be effectively formed by utilizing the lithium-containing compound, the pH-controlling agent and/or the like.

The third heat-treatment may be performed under an oxidizing gas atmosphere such as oxygen or air atmosphere, and/or under any other suitable atmosphere. The third heat-treatment may be performed, for example, at about 650° C. to about 900° C. or about 650° C. to about 800° C. The time used for performing the third heat-treatment may vary depending on a heat-treatment temperature and/or the like, for example, the time of the heat-temperature treatment may be about 5 hours to about 30 hours or about 10 hours to about 24 hours.

Subsequently, when the heat-treatment is completed, the heat-treated product is cooled to room temperature, and the aforementioned positive active material is prepared for a rechargeable lithium battery according to one or more embodiments. The prepared positive active material is in a state that the first positive active material including secondary particles, which are formed of the aggregated primary particles, is mixed with the second positive active material having a single particle form (e.g., individual, separate particle forms), wherein the first and second positive active materials are respectively coated with cobalt and the second positive active material includes both (e.g., simultaneously) the uneven surface and even surface.

Positive Electrode

A positive electrode for a rechargeable lithium battery may include a current collector and a positive active material layer on the current collector. The positive active material layer may include a positive active material, and may further include a binder and/or a conductive material.

The binder improves binding properties of positive active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or other suitable material(s), but the present disclosure is not limited thereto.

The content (e.g., amount) of the binder in the positive active material layer may be about 1 wt % to about 5 wt % based on the total weight of the positive active material layer.

The conductive material is included to provide electrode conductivity. Any electrically conductive material may be utilized as a conductive material unless it causes a chemical change. Examples of the conductive material may include a carbon-based material such as natural graphite, artificial graphite, carbon black, acetylene black, ketjen black, a carbon fiber, carbon nanotube, and/or any other suitable carbon-based material(s); a metal-based material of a metal powder or a metal fiber including copper, nickel, aluminum, silver, and/or any other suitable metal-based material(s); a conductive polymer such as a polyphenylene derivative; or a mixture thereof.

The content (e.g., amount) of the conductive material in the positive active material layer may be about 1 wt % to about 5 wt % based on the total weight of the positive active material layer.

An aluminum foil may be utilized as the positive electrode current collector, but the present disclosure is not limited thereto.

Negative Electrode

A negative electrode for a rechargeable lithium battery includes a current collector and a negative active material layer on the current collector. The negative active material layer may include a negative active material, and may further include a binder and/or a conductive material.

The negative active material may include a material that reversibly intercalates/deintercalates lithium ions, a lithium metal, a lithium metal alloy, a material capable of doping/dedoping lithium, or transition metal oxide.

The material that reversibly intercalates/deintercalates lithium ions may include, for example crystalline carbon, amorphous carbon, or a combination thereof as a carbon-based negative active material. The crystalline carbon may be non-shaped, or sheet, flake, spherical, or fiber shaped natural graphite or artificial graphite. The amorphous carbon may be a soft carbon, a hard carbon, a mesophase pitch carbonization product, calcined coke, and/or any other suitable amorphous carbon.

The lithium metal alloy includes an alloy of lithium and a metal, which may include (e.g., be) Na, K, Rb, Cs, Fr, Be, Mg, Ca, Sr, Si, Sb, Pb, In, Zn, Ba, Ra, Ge, Al, and/or Sn.

The material capable of doping/dedoping lithium may be a Si-based negative active material or a Sn-based negative active material. The Si-based negative active material may include silicon, a silicon-carbon composite, $SiO_x$ ($0<x<2$), a Si-Q alloy (wherein Q is an alkali metal, an alkaline-earth metal, a Group 13 element, a Group 14 element, a Group 15 element, a Group 16 element, a transition metal, a rare earth element, or a combination thereof, but not Si) and the Sn-based negative active material may include Sn, $SnO_2$, Sn—R alloy (wherein R is an alkali metal, an alkaline-earth metal, a Group 13 element, a Group 14 element, a Group 15 element, a Group 16 element, a transition metal, a rare earth element, or a combination thereof, but not Sn). At least one of these materials may be mixed with $SiO_2$. The elements Q and R may include (e.g., be) Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The silicon-carbon composite may be, for example, a silicon-carbon composite including a core including crystalline carbon and silicon particles and an amorphous carbon coating layer disposed on the surface of the core. The crystalline carbon may be artificial graphite, natural graphite, or a combination thereof. The amorphous carbon precursor may be a coal-based pitch, mesophase pitch, petroleum-based pitch, coal-based oil, petroleum-based heavy oil, and/or a polymer resin such as a phenol resin, a furan resin, and/or a polyimide resin. In one or more embodiments, the content (e.g., amount) of silicon may be about 10 wt % to about 50 wt % based on the total weight of the silicon-carbon composite. In one or more embodiments, the content (e.g., amount) of the crystalline carbon may be about 10 wt % to about 70 wt % based on the total weight of the silicon-carbon composite, and the content (e.g., amount) of the amorphous carbon may be about 20 wt % to about 40 wt % based on the total weight of the silicon-carbon composite. In one or more embodiments, a thickness of the amorphous carbon coating layer may be about 5 nm to about 100 nm. An average particle diameter (D50) of the silicon particles may be about 10 nm to about 20 μm. The average particle diameter (D50) of the silicon particles may be about 10 nm to about 200 nm. The silicon particles may exist in an oxidized form, and in one or more embodiments, an atomic content (e.g., amount) ratio of Si:O in the silicon particles indicating a degree of oxidation may be of about 99:1 to about 33:67. The silicon particles may be $SiO_x$ particles, and in one or more embodiments, the range of x in $SiO_x$ may be greater than about 0 and less than about 2.

The Si-based negative active material or Sn-based negative active material may be mixed with the carbon-based negative active material. When the Si-based negative active material or Sn-based negative active material and the carbon-based negative active material are mixed and utilized, the mixing ratio may be a weight ratio of about 1:99 to about 90:10.

In the negative active material layer, the negative active material may be included in an amount of about 95 wt % to about 99 wt % based on the total weight of the negative active material layer.

In one or more embodiments, the negative active material layer further includes a binder, and may optionally further include a conductive material. The content (e.g., amount) of the binder in the negative active material layer may be about 1 wt % to about 5 wt % based on the total weight of the negative active material layer. In one or more embodiments, when the conductive material is further included, the negative active material layer may include about 90 wt % to about 98 wt % of the negative active material, about 1 wt % to about 5 wt % of the binder, and about 1 wt % to about 5 wt % of the conductive material.

The binder serves to adhere the negative active material particles to each other and also to adhere the negative active material to the current collector. The binder may be a water-insoluble binder, a water-soluble binder, or a combination thereof.

Examples of the water-insoluble binder include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoro ethylene, polyvinylidene fluoride, polyethylene, polypropylene, polyamideimide, polyimide, or a combination thereof.

The water-soluble binder may include a rubber binder or a polymer resin binder. The rubber binder may include (e.g., be) a styrene-butadiene rubber, an acrylated styrene-butadiene rubber, an acrylonitrile-butadiene rubber, an acrylic rubber, a butyl rubber, a fluororubber, or a combination thereof. The polymer resin binder may include (e.g., be) polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, or a combination thereof.

When a water-soluble binder is utilized as the negative electrode binder, a thickener such as a cellulose-based compound capable of imparting viscosity may be further included. As the cellulose-based compound, one or more of carboxymethyl cellulose, hydroxypropylmethyl cellulose, methyl cellulose, or alkali metal salts thereof may be mixed and utilized. As the alkali metal, Na, K, and/or Li may be utilized. The amount of the thickener utilized may be about 0.1 parts by weight to about 3 parts by weight based on 100 parts by weight of the negative active material.

The conductive material is included to provide electrode conductivity. Any electrically conductive material may be utilized as a conductive material unless it causes a chemical change. Examples of the conductive material include a carbon-based material such as natural graphite, artificial graphite, carbon black, acetylene black, ketjen black, a carbon fiber, carbon nanotube, and/or any other suitable carbon-based material(s); a metal-based material of a metal powder or a metal fiber including copper, nickel, aluminum silver, and/or any other suitable metal-based material(s); a conductive polymer such as a polyphenylene derivative; or a mixture thereof.

The negative electrode current collector may include a copper foil, a nickel foil, a stainless-steel foil, a titanium foil, a nickel foam, a copper foam, a polymer substrate coated with a conductive metal, or a combination thereof.

Rechargeable Lithium Battery

One or more embodiments provides a rechargeable lithium battery including a positive electrode, a negative electrode, a separator between the positive electrode and the negative electrode (to, e.g., separate and/or insulate the positive electrode from the negative electrode or vice versa), and an electrolyte.

FIG. 1 is a schematic view illustrating a rechargeable lithium battery according to one or more embodiments of the present disclosure. Referring to FIG. 1, a rechargeable lithium battery 100 according to one or more embodiments includes a battery cell including a positive electrode 114, a negative electrode 112 facing the positive electrode 114, a separator 113 between the positive electrode 114 and the negative electrode 112, and an electrolyte for a rechargeable lithium battery impregnating the positive electrode 114, the negative electrode 112, and the separator 113, a battery case 120 housing the battery cell, and a sealing member 140 sealing the battery case 120.

The electrolyte includes a non-aqueous organic solvent and a lithium salt.

The non-aqueous organic solvent serves as a medium for transmitting ions taking part in the electrochemical reaction of a battery. The non-aqueous organic solvent may be a carbonate-based, ester-based, ether-based, ketone-based, and/or alcohol-based solvent, and/or aprotic solvent. Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or any other suitable carbonate-based solvent. Examples of the ester-based solvent include methyl acetate, ethyl acetate, n-propyl acetate, dimethyl acetate, methyl propionate, ethyl propionate, γ-butyrolactone, decanolide, valerolactone, mevalonolactone, caprolactone, and/or any other suitable ester-based solvent. The ether-based solvent may be dibutyl ether, tetraglyme, diglyme, dimethoxyethane, 2-methyltetrahydrofuran, tetrahydrofuran, and/or any other suitable ether-based solvent and the ketone-based solvent may be cyclohexanone, and/or any other suitable ketone-based solvent. In one or more embodiments, the alcohol-based solvent may be ethyl alcohol, isopropyl alcohol, etc. and the aprotic solvent may be nitriles such as R—CN (where R is a C2 to C20 linear, branched, or cyclic hydrocarbon group and may include a double bond, an aromatic ring, and/or an ether bond), amides such as dimethylformamide, dioxolanes such as 1,3-dioxolane, sulfolanes, and/or the like.

The non-aqueous organic solvent may be utilized alone or in a mixture. When the organic solvent is utilized in a mixture, the mixture ratio may be controlled or selected in accordance with a desirable battery performance.

In one or more embodiments, in the case of the carbonate-based solvent, a mixture of a cyclic carbonate and a chain carbonate may be utilized. In this case, when the cyclic carbonate and the chain carbonate are mixed in a volume ratio of about 1:1 to about 1:9, the electrolyte may exhibit excellent or suitable performance.

The non-aqueous organic solvent may further include an aromatic hydrocarbon-based organic solvent in addition to the carbonate-based solvent. In this case, the carbonate-based solvent and the aromatic hydrocarbon-based organic solvent may be mixed in a volume ratio of about 1:1 to about 30:1.

As the aromatic organic hydrocarbon-based solvent, an aromatic hydrocarbon-based compound represented by Chemical Formula I may be utilized.

Chemical Formula I

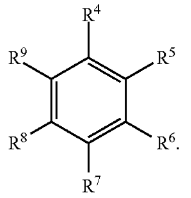

In Chemical Formula I, $R^4$ to $R^9$ may each independently be the same or different and may include (e.g., be) hydrogen, a halogen, a C1 to C10 alkyl group, a C1 to C10 haloalkyl group, or a combination thereof.

Specific examples of the aromatic hydrocarbon-based solvent may include (e.g., be) benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, or a combination thereof.

The electrolyte may further include vinylene carbonate or an ethylene carbonate-based compound of Chemical Formula II in order to improve cycle-life of a battery.

Chemical Formula II

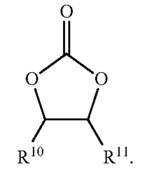

In Chemical Formula II, $R^{10}$ and $R^{11}$ may each independently be the same or different, and may include (e.g., be) hydrogen, a halogen, a cyano group, a nitro group, and fluorinated C1 to C5 alkyl group, provided that at least one of $R^{10}$ or $R^{11}$ may include (e.g., be) a halogen, a cyano group, a nitro group, and a fluorinated C1 to C5 alkyl group, but both (e.g., simultaneously) of $R^{10}$ and $R^{11}$ are not hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, and/or fluoroethylene carbonate. The amount of the additive for improving cycle-life may be utilized within an appropriate or suitable range.

The lithium salt dissolved in the non-aqueous organic solvent supplies lithium ions in a battery, enables a basic operation of a rechargeable lithium battery, and improves transportation of the lithium ions between positive and negative electrodes.

Examples of the lithium salt include at least one supporting salt including (e.g., being) $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide, LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, wherein x and y are natural numbers, for example, an integer in a range of 1 to 20, lithium difluoro(bisoxolato) phosphate, LiCl, LiI, $LiB(C_2O_4)_2$ (lithium bis(oxalato) borate, LiBOB), and/or lithium difluoro(oxalato)borate (LiDFOB).

The lithium salt may be utilized in a concentration in a range of about 0.1 M to about 2.0 M. When the lithium salt is included at the above concentration range, an electrolyte may have excellent or suitable performance and lithium ion mobility due to optimal or suitable electrolyte conductivity and viscosity.

The separator 113 separates a positive electrode 114 and a negative electrode 112 and provides a transporting passage for lithium ions and may be any generally-utilized separator in a lithium ion battery. In other words, it may have low resistance to ion transport and excellent or suitable impregnation for an electrolyte. The separator 113 may include, for example, glass fiber, polyester, polyethylene, polypropylene, polytetrafluoroethylene, or a combination thereof, and may be in the form of a non-woven or woven fabric. For example, in a lithium ion battery, a polyolefin-based polymer separator such as polyethylene and polypropylene may be mainly utilized. In order to ensure the heat resistance or mechanical strength, a coated separator including a ceramic component or a polymer material may be utilized. Optionally, it may have a mono-layered or multi-layered structure.

A rechargeable lithium battery may be classified as lithium ion batteries, lithium ion polymer batteries, and lithium polymer batteries according to the presence of a separator and the kind of electrolyte utilized therein. The rechargeable lithium battery may have a variety of shapes and sizes, and include cylindrical, prismatic, coin, or pouchtype or kind batteries, and may be thin film batteries or may be rather bulky in size. Structures and manufacturing methods for lithium ion batteries pertaining to this disclosure are well known in the art.

The rechargeable lithium battery according to one or more embodiments may be utilized in an electric vehicles (EV), hybrid electric vehicles such as plug-in hybrid electric vehicles (PHEV), and portable electronic devices because it implements a high capacity and has excellent or suitable storage stability, cycle-life characteristics, and high rate characteristics at high temperatures.

Hereinafter, examples of the present disclosure and comparative examples are described. It is to be understood, however, that the examples are for the purpose of illustration and are not to be construed as limiting the present disclosure.

Example 1

1. Preparation of First Nickel-Based Oxide in Form of Secondary Particles

The first nickel-based hydroxide ($Ni_{0.95}Co_{0.04}Mn_{0.01}(OH)_2$) obtained by the coprecipitation method and LiOH are mixed so that the mole ratio of lithium to the total amount of the transition metal is 1.04, and the mixture is subjected to a first heat-treatment at about 750° C. for 15 hours in an oxygen atmosphere to obtain a first nickel-based oxide ($LiNi_{0.95}Co_{0.04}Mn_{0.01}O_2$). The obtained first nickel-based oxide has an average particle diameter of about 13.8 μm, and is in the form of secondary particles in which primary particles are aggregated.

2. Preparation of Second Nickel-Based Oxide in Single Particle Form Co-Precipitation Process Nickel sulfate ($NiSO_4 \cdot 6H_2O$), cobalt sulfate ($CoSO_4 \cdot 7H_2O$), and manganese sulfate ($MnSO_4 \cdot H_2O$) are dissolved in distilled water as a solvent, preparing a mixed solution. In order to form a complex, an ammonia water ($NH_4OH$) diluent and sodium hydroxide (NaOH) as a precipitant are prepared. Subsequently, the raw metal material mixed solution, the ammonia water, and the sodium hydroxide are each put into a reactor. While stirred, a reaction proceeds for about 20 hours. Subsequently, the slurry solution in the reactor is filtered, washed with distilled water with high purity, and dried for 24 hours, obtaining a second nickel-based hydroxide ($Ni_{0.94}Co_{0.05}Mn_{0.01}(OH)_2$) powder. The obtained second nickel-based hydroxide powder has an average particle diameter of about 4.0 μm and a specific surface area of about 15 $m^2/g$, which is measured in a BET method.

Oxidation Process

The obtained second nickel-based hydroxide is mixed with LiOH to satisfy Li/(Ni+Co+Mn)=1.05 and put in a furnace and then, is subjected to second heat-treatment at 910° C. for 8 hours under an oxygen atmosphere. Subsequently, the obtained product is pulverized for about 30 minutes and then, separated/dispersed into a plurality of second nickel-based oxides having a single particle structure (e.g., individual, separate particle structures). The second nickel-based oxides ($LiNi_{0.94}Co_{0.05}Mn_{0.01}O_2$) having a single particle structure (e.g., individual, separate particle structures) has an average particle diameter of about 3.7 μm.

3. Cobalt Coating and Preparation of Final Positive Active Material

The first nickel-based oxide and the second nickel-based oxide are mixed in a weight ratio of 7:3, and this mixture is washed in a weight ratio of 1:1 with water in a stirrer and dried at 150° C. Herein, 5 parts by mole of lithium hydroxide and 2.5 parts by mole of cobalt oxide based on 100 parts by mole of the total amount of metals excluding lithium in the first nickel-based oxide and the second nickel-based oxide of the nickel-based oxides are additionally mixed therewith and then, put in a furnace and thirdly heat-treated at about 710° C. for 15 hours under an oxygen atmosphere. Subsequently, the furnace is cooled to room temperature, obtaining a final positive active material in which the first positive active material and the second positive active material are mixed.

The final positive active material is a mixture of the first positive active material in a secondary particle form and the second positive active material having a single particle form (e.g., individual, separate particle forms), which are respectively coated with cobalt.

Figure 2:
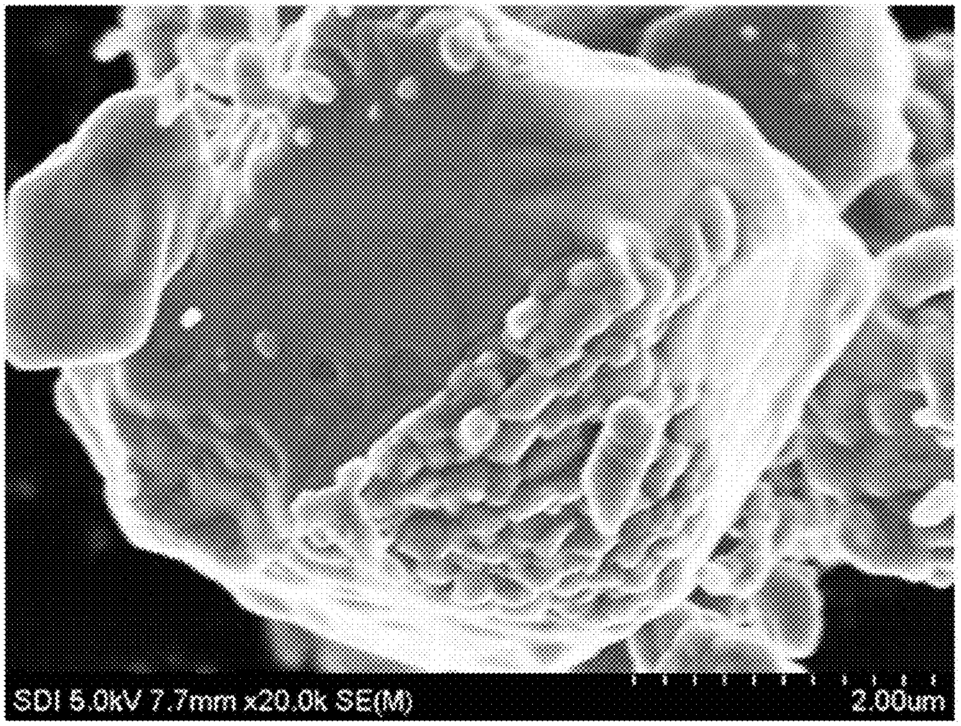
FIG. 2 is a scanning electron microscopic image of the second positive active material of Example 1.

FIG. 2 is a scanning electron microscope image of particles corresponding to a second positive active material in the final positive active material prepared according to Example 1. Referring to FIG. 2, the second positive active material, which is a single particle (e.g., individual, separate particles), has an uneven surface and an even surface formed on the surface.

4. Manufacture of Positive Electrode 95 wt % of the final positive active material, 3 wt % of a polyvinylidene fluoride binder, and 2 wt % of carbon nanotube conductive material are mixed in an N-methylpyrrolidone solvent to prepare positive active material slurry. The positive active material slurry is applied to an aluminum current collector, dried, and then compressed to manufacture a positive electrode.

5. Manufacture of Coin-Type Half Cell

A coin half-cell is manufactured by disposing a separator having a polyethylene polypropylene multilayer structure between the manufactured positive electrode and lithium metal counter electrode, and injecting an electrolyte solution in which 1.0 M $LiPF_6$ lithium salt was added to a solvent in which ethylene carbonate and diethyl carbonate are mixed in a volume ratio of 50:50.

Example 2

Figure 3:
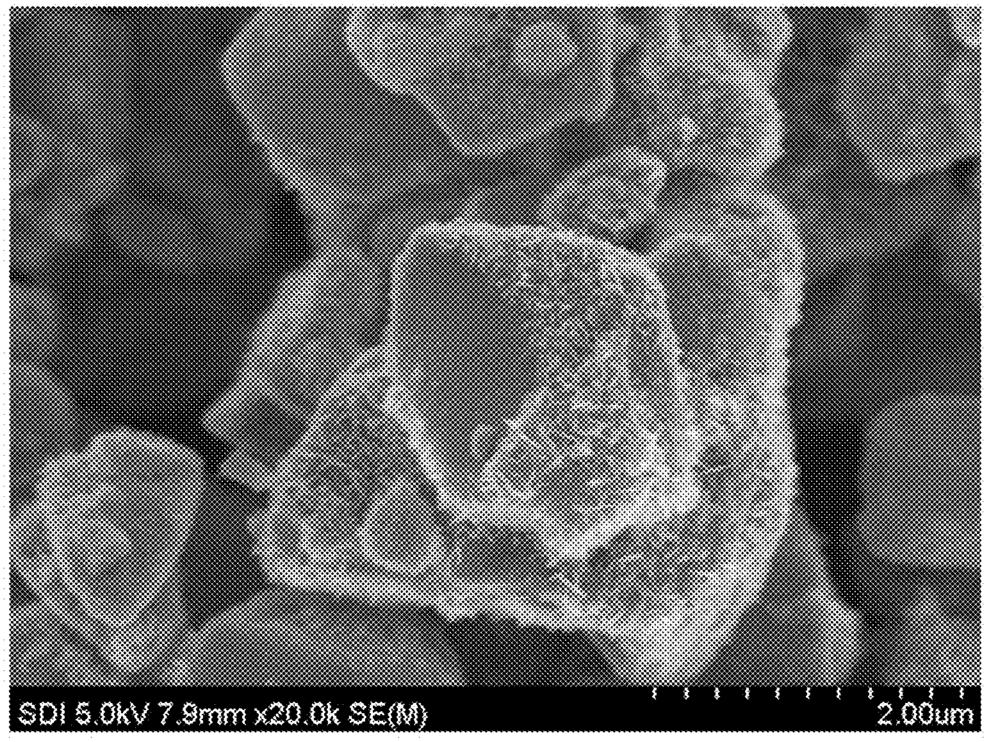
FIG. 3 is a scanning electron microscope image of the second positive active material before a third heat-treatment after cobalt coating in Example 2.

A positive active material, a positive electrode, and a cell are manufactured according to the same method as Example 1 except that the cobalt coating is performed in a wet method in "3. Cobalt Coating and Preparation of a Final Positive Active Material" of Example 1. The cobalt coating process is as follows. The first nickel-based oxide and the second nickel-based oxide are mixed in a weight ratio of 7:3 and then, put in distilled water and washed therewith, while mixed. Subsequently, 2.5 parts by mole of cobalt sulfate ($CoSO_4$) based on 100 parts by mole of the total amount of metals excluding lithium in the first nickel-based oxide and the second nickel-based oxide of the nickel-based oxides is slowly added thereto to perform cobalt coating. In one or more embodiments, sodium hydroxide (NaOH) is slowly added thereto. Then, a product obtained therefrom is dried at 150° C. for 12 hours. FIG. 3 is a scanning electron microscope image of a second nickel-based oxide having a single particle (e.g., individual, separate particles) among the dried materials, and an uneven surface and an even surface are formed on the surface thereof.

Subsequently, the dried material is put in a furnace and is subjected to a third heat-treatment at about 710° C. for 15 hours under an oxygen atmosphere. Then, the furnace is cooled to room temperature, obtaining a final positive active material in which the first and second positive active materials are mixed.

Figure 4:
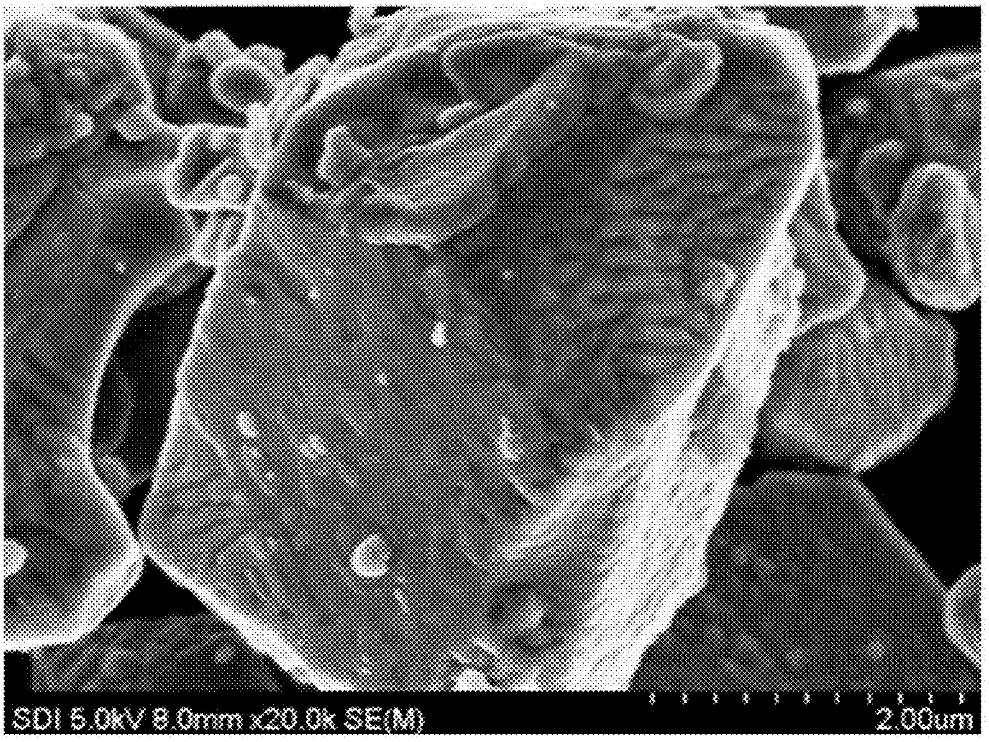
FIG. 4 is a scanning electron microscope image of the final second positive active material in Example 2.

FIG. 4 is a scanning electron microscope of particles having a single-crystal (e.g., individual, separate crystals)

second positive active material in the obtained final positive electrode active material. Referring to FIG. 4, the uneven surface and the even surface are formed on the surface of the second positive electrode active material. The second positive active material has an average particle diameter of about 4 μm.

Comparative Example 1

A positive active material and a cell are manufactured according to the same method as Example 1 except that the first nickel-based oxide and the second nickel-based oxide are not mixed first and then coated, but individually coated and then mixed in "3. Cobalt Coating and Preparation of a Final Positive Active Material" of Example 1.

The cobalt coating proceeds as follows. 5 parts by mole of lithium hydroxide and 3 parts by mole of cobalt oxide based on 100 parts by mole of the total amount of metals excluding lithium in the first nickel-based oxide are mixed with the first nickel-based oxide and then, put in a furnace and thirdly heat-treated at about 700° C. for 15 hours under an oxygen atmosphere, and then cooled to room temperature, obtaining a first positive active material. In one or more embodiments, 5 parts by mole of lithium hydroxide and 3 parts by mole of cobalt oxide based on 100 parts by mole of the total amount of metals excluding lithium in the first nickel-based oxide are mixed with the second nickel-based oxide, and then put in a furnace and thirdly heat-treated at about 850° C. for 15 hours under an oxygen atmosphere, and then cooled to room temperature, obtaining a second positive active material. The cobalt-coated first positive active material and the cobalt-coated second positive active material are mixed in a weight ratio of 7:3, preparing a final positive active material according to Comparative Example 1.

Figure 5:
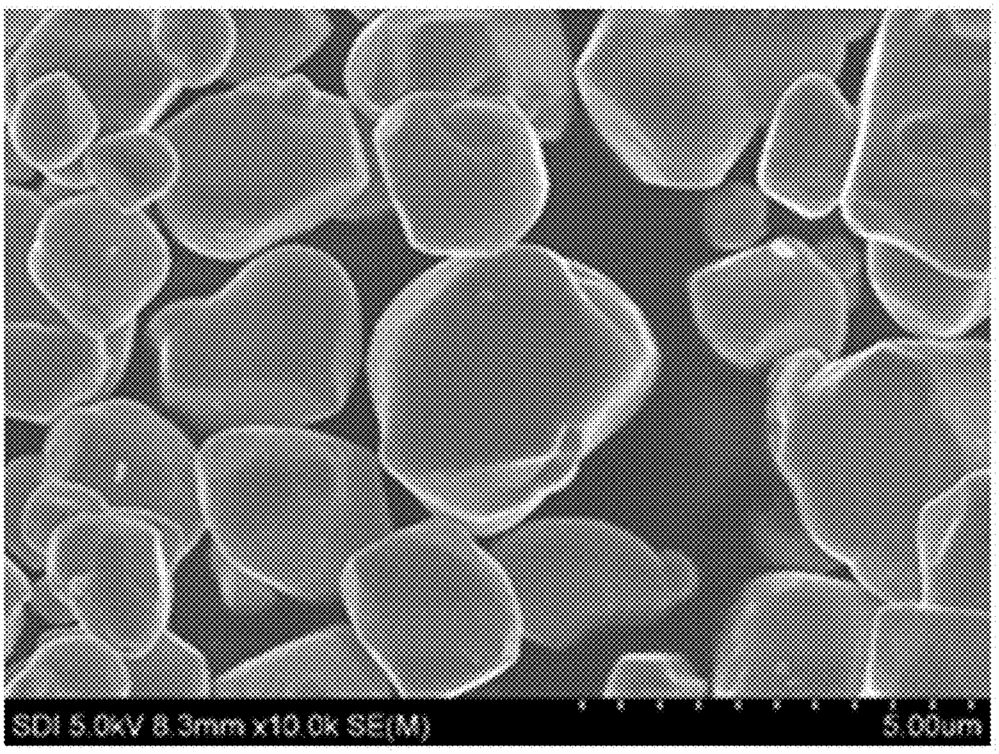
FIG. 5 is a scanning electron microscope image of a second positive active material of Comparative Example 1.

FIG. 5 is a scanning electron microscopic image of the second positive active material prepared according to Comparative Example 1. Referring to FIG. 5, the surface of the second positive active material of Comparative Example 1 has no unevenness on the surface but is smooth and even.

Comparative Example 2

A positive active material and a cell are manufactured according to the same method as Comparative Example 1 except that the third heat-treatment of the second nickel-based oxide is performed at about 700° C. for 15 hours under an oxygen atmosphere.

Figure 6:
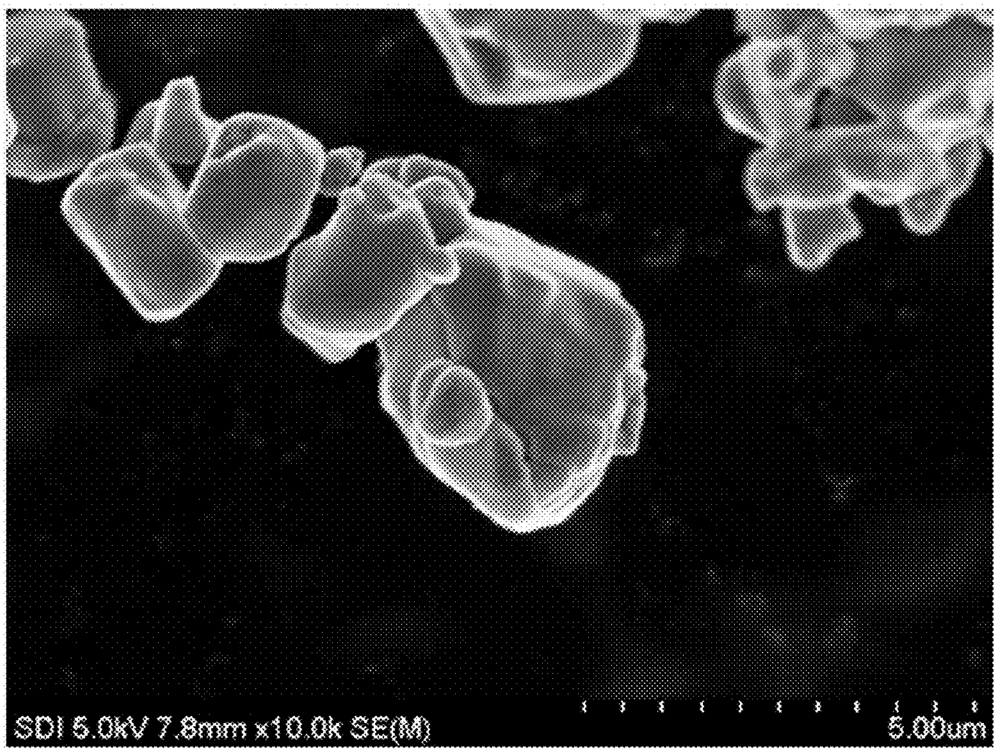
FIG. 6 is a scanning electron microscope image of the second positive active material of Comparative Example 2.

FIG. 6 is a scanning electron microscopic image of the second positive active material prepared according to Comparative Example 2. Referring to FIG. 6, the surface of the second positive active material of Comparative Example 2 has no unevenness but is smooth and even.

Evaluation Example 1: Evaluation of Surface Roughness of Second Positive Active Material The positive active materials according to Examples 1 and 2 and Comparative Examples 1 and 2 are measured with respect to surface roughness of the second positive active materials through a surface roughness meter utilizing atomic force microscopy (scan speed: 0.25 μm/s, non-contact mode range: 250 nm×250 nm, DME UHV AFM). The results are shown in Table 1. In Table 1, the unit of each numerical value is nm.

TABLE 1

| | Example 1 | | Example 2 | | | |
|---|---|---|---|---|---|---|
| | Uneven surface | Even surface | Uneven surface | Even surface | Comparative Example 1 | Comparative Example 2 |
| Maximum roughness ($R_{max}$) | 35 | 12.0 | 23.8 | 10 | 6.7 | 10.1 |
| Average roughness ($R_a$) | 3.35 | 1.7 | 2.0 | 1.2 | 0.73 | 0.99 |
| Root mean square roughness ($R_q$) | 4.5 | 2.0 | 2.5 | 1.8 | 0.8 | 1.3 |

Evaluation Example 2: Evaluation of Specific Surface Area

The positive active materials of Examples 1 and 2 and Comparative Examples 1 and 2 are measured with respect to a specific surface area, and the results are shown in Table 2. The specific surface area is measured by utilizing a physical and chemical adsorption phenomenon and a Brunauer-Emmett-Teller (BET) method. In other words, after measuring weights of the active materials, nitrogen is absorbed on the surface of the active materials, and an amount of the absorbed nitrogen gas is measured and utilized to obtain the specific surface area by utilizing the BET method.

TABLE 2

| | BET specific surface area ($m^2/g$) |
|---|---|
| Example 1 | 0.3856 |
| Example 2 | 0.3652 |
| Comparative Example 1 | 0.2575 |
| Comparative Example 2 | 0.2521 |

Referring to Table 2, the positive active materials including the first and second positive active materials according to Examples 1 and 2 exhibit an increased specific surface area, compared with the positive active materials of the comparative examples.

Evaluation Example 3: Evaluation of Surface Cobalt Content

Figure 7:
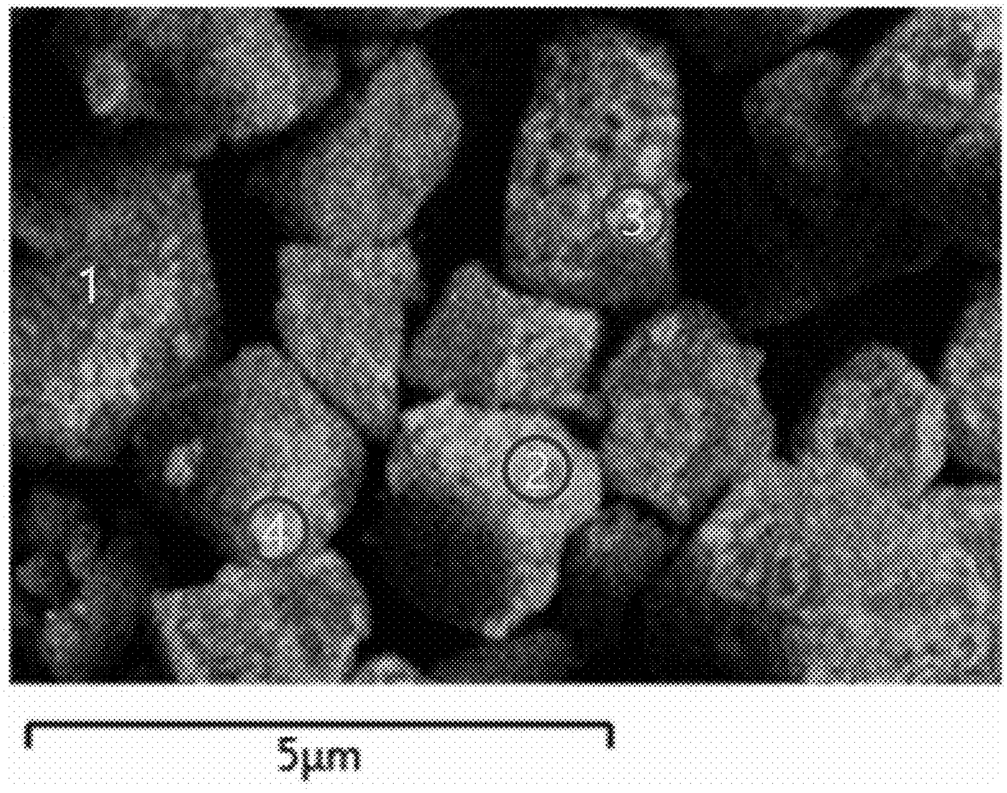
FIG. 7 is an image of mapping cobalt elements by SEM-EDS (Scanning Electron Microscope-Energy Dispersive Spectroscopy analysis of the second positive active material according to Example 1.
Figure 8:
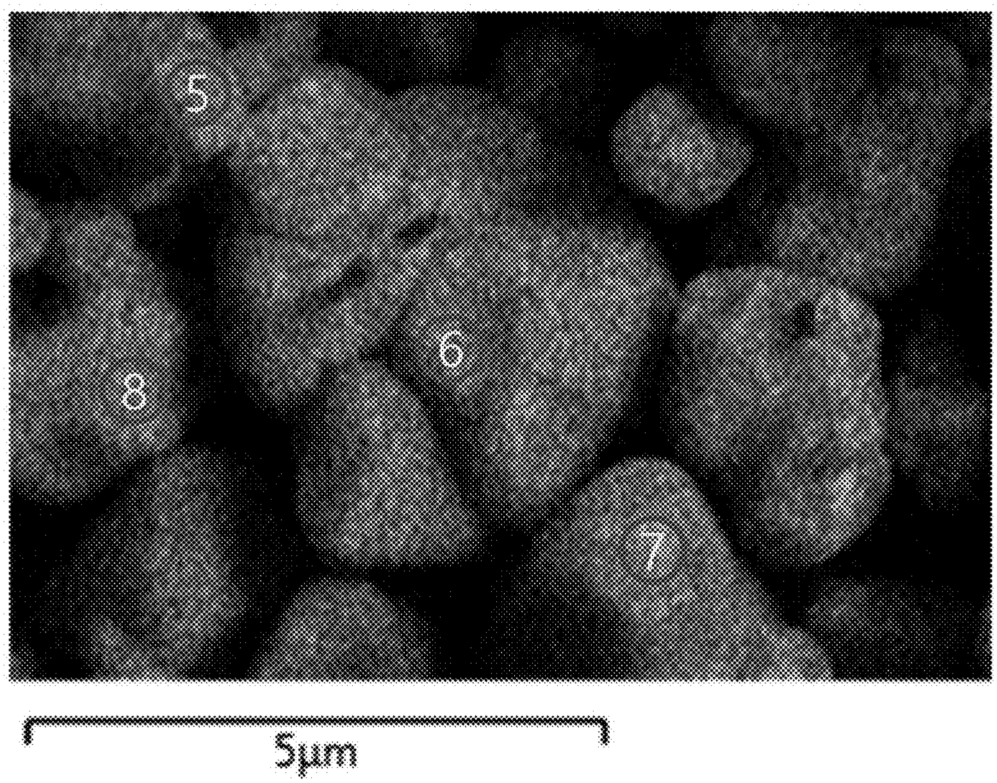
FIG. 8 is an image of mapping cobalt elements by SEM-EDS analysis of the second positive active material according to Comparative Example 1.

Scanning electron microscope-energy dispersive spectroscopy (SEM-EDS) was performed on the surface of the single-crystal (e.g., the individual, separate crystals) second positive active material in the positive active materials according to Example 1 and Comparative Example 1 to measure a content (e.g., amount) ratio (at %) of a cobalt content (e.g., amount) to a nickel and cobalt content (e.g., amount) on the surface. FIG. 7 is a scanning electron microscope image of the second positive active material according to Example 1, in which each cobalt content (e.g., amount) at positions 1 to 4 is measured, and the results are provided in Table 3. FIG. 8 is a scanning electron microscope image of the second positive active material according to Comparative Example 1, in which each cobalt content (e.g., amount) at positions 5 to 8 is measured, and the results are provided in Table 4.

TABLE 3

| | Position | Co/(Ni + Co) (at %) |
|---|---|---|
| Example 1 | #1 | 19.4 |
| | #2 | 60.2 |
| | #3 | 40.7 |
| | #4 | 52.9 |

TABLE 4

| | Position | Co/(Ni + Co) (at %) |
|---|---|---|
| Comparative Example 1 | #5 | 8.9 |
| | #6 | 15.5 |
| | #7 | 12 |
| | #8 | 8.6 |

Referring to FIG. 7 and Table 3, in the second positive active material of Example 1, a side having a low cobalt content (e.g., amount) of 19.4 at % and also, a side having a high cobalt content (e.g., amount) of 40 at % to 60 at % are present.

Referring to FIG. 8 and Table 4, in Comparative Example 1, in which the first positive active material and the second positive active material are separately cobalt-coated, the second positive active material exhibits a cobalt content (e.g., amount) on the surface in a range of about 8 at % to 16 at % and almost no difference between crystal planes. In addition, the cobalt coating content (e.g., amount) on the surface belongs to a lower range than that of Example 1.

Evaluation Example 4: Charging/Discharging Efficiency and Cycle-Life Characteristics The coin-type or kind half cells of Examples 1 and 2 and Comparative Examples 1 and 2 are respectively charged under constant current (0.2 C) and constant voltage (4.25 V, 0.05 C cut-off) conditions to measure charge capacity and then, paused for 10 minutes and discharged to 3.0 V under a constant current (0.2 C) condition to measure discharge capacity. A ratio the discharge capacity relative to the charge capacity is shown as efficiency. The results are shown in Table 5.

In addition, the cells are initially charged and discharged and then, 50 times charged and discharged at 1 C at 45° C. to measure the $50^{th}$ discharge capacity, and a ratio (%) of the $50^{th}$ discharge capacity relative to the initial discharge capacity is expressed as capacity retention, that is, cycle-life characteristics in Table 5.

TABLE 5

| | Charge capacity (mAh/g) | Discharge capacity (mAh/g) | Efficiency (%) | 50 cycle capacity retention (%, 45° C.) |
|---|---|---|---|---|
| Example 1 | 238.3 | 211.6 | 88.8 | 95.2 |
| Example 2 | 238.8 | 208.5 | 87.3 | 96.4 |
| Comparative Example 1 | 236.2 | 203.8 | 86.3 | 93.5 |
| Comparative Example 2 | 234.5 | 200.7 | 85.6 | 92.3 |

Referring to Table 5, Examples 1 and 2 exhibit increased discharge and improved charge and discharge efficiency and also, improved high temperature cycle-life characteristics, compared with Comparative Examples 1 and 2 in which the first and second positive active materials are separately cobalt-coated and fired.

Although both the first positive active material and the second positive active material are coated with cobalt, the cobalt is effectively coated on only some surfaces of the second positive active material, which is a single particle (e.g., individual, separate, non-aggregated particles), resulting in uneven surfaces (e.g., concavo-convex surfaces) and thus increasing a specific surface area and/or the like, and a battery cell manufactured by applying the positive active material turns out to have improved characteristics such as initial discharge capacity, charge and discharge efficiency, cycle-life, and/or the like.

The vehicle, the electronic device, and/or the battery, e.g., a battery controller, and/or any other relevant devices or components according to embodiments of the present invention described herein may be implemented utilizing any suitable hardware, firmware (e.g. an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the embodiments of the present disclosure.

While this present disclosure has been described in connection with what is presently considered to be example embodiments, it is to be understood that the present disclosure is not limited to the disclosed embodiments. In contrast, it is intended to cover one or more suitable modifications and equivalent arrangements included within the spirit and scope of the appended claims and their equivalents.

DESCRIPTION OF SYMBOLS

| Description of Symbols | |
|---|---|
| 100: rechargeable lithium battery | 112: negative electrode |
| 113: separator | 114: positive electrode |
| 120: battery case | 140: sealing member |

What is claimed is:

1. A positive active material for a rechargeable lithium battery, the positive active material comprising:

a first positive active material comprising a first lithium nickel-based composite oxide, and comprising secondary particles formed by aggregation of a plurality of primary particles and a cobalt coating portion on a surface of the secondary particles, and a second positive active material comprising a second lithium nickel-based composite oxide and comprising individual particles and a cobalt coating portion on a surface of the individual particles, wherein the second positive active material has:

an uneven surface comprising concavo-convex features and having a maximum roughness ($R_{max}$; peak to peak height) of greater than or equal to about 18 nm; and an even surface that is substantially flat and having a maximum roughness ($R_{max}$) of less than or equal to about 15 nm.

2. The positive active material for a rechargeable lithium battery of claim 1, wherein the maximum roughness of the uneven surface is greater than or equal to about 20 nm.

3. The positive active material for a rechargeable lithium battery of claim 1, wherein the uneven surface of the second positive active material has an average roughness ($R_a$) of greater than or equal to about 1.9 nm and a root mean square roughness ($R_q$) of greater than or equal to about 2.3 nm.

4. The positive active material for a rechargeable lithium battery of claim 1, wherein the maximum roughness of the even surface is less than or equal to about 14 nm.

5. The positive active material for a rechargeable lithium battery of claim 1, wherein the even surface of the second positive active material has an average roughness ($R_a$) of less than or equal to about 1.8 nm and a root mean square roughness ($R_q$) of less than or equal to about 2.2 nm.

6. The positive active material for a rechargeable lithium battery of claim 1, wherein a ratio of area of the uneven surface to total surface area of the second positive active material is about 40% to about 80%.

7. The positive active material for a rechargeable lithium battery of claim 1, wherein the positive active material comprising the first positive active material and the second positive active material has a Brunauer, Emmett and Teller (BET) specific surface area of about 0.2 $m^2/g$ to about 0.6 $m^2/g$.

8. The positive active material for a rechargeable lithium battery of claim 1, wherein the first positive active material has an average particle diameter of about 7 μm to about 25 μm, and the second positive active material has an average particle diameter of about 0.05 μm to about 10 μm.

9. The positive active material for a rechargeable lithium battery of claim 1, wherein the first positive active material is included in an amount of about 50 wt % to about 90 wt % and the second positive active material is included in an amount of about 10 wt % to about 50 wt % based on total amount of the first positive active material and the second positive active material.

10. The positive active material for a rechargeable lithium battery of claim 1, wherein the first positive active material comprises the first lithium nickel-based composite oxide represented by Chemical Formula 1, and the second positive active material comprises the second lithium nickel-based composite oxide represented by Chemical Formula 11:

$Li_{a1}Ni_{x1}M^1_{y1}M^2_{1-x1-y1}O_2$ Chemical Formula 1 wherein, in Chemical Formula 1, $0.9 \le a1 \le 1.8$, $0.3 \le x1 \le 1$, $0 \le y1 \le 0.7$, and $M^1$ and $M^2$ are each independently Al, B, Ba, Ca, Ce, Co, Cr, Cu, F, Fe, Mg, Mn, Mo, Nb, P, S, Si, Sr, Ti, V, W, Zr, or a combination thereof, $Li_{a11}Ni^{x11}M^{11}_{y11}M^{12}_{1-x11-y11}O_2$ Chemical Formula 11 wherein, in Chemical Formula 11, $0.9 \le a11 \le 1.8$, $0.3 \le x11 \le 1$, $0 \le y11 \le 0.7$, and $M^{11}$ and $M^{12}$ are each independently Al, B, Ba, Ca, Ce, Co, Cr, Cu, F, Fe, Mg, Mn, Mo, Nb, P, S, Si, Sr, Ti, V, W, Zr, or a combination thereof.

11. A rechargeable lithium battery comprising a positive electrode comprising the positive active material of claim 1, a negative electrode, and an electrolyte.

* * * * *